(12) United States Patent
Furudate et al.

(10) Patent No.: US 11,059,036 B2
(45) Date of Patent: *Jul. 13, 2021

(54) MIXTURE OF VISIBLE LIGHT-RESPONSIVE PHOTOCATALYTIC TITANIUM OXIDE FINE PARTICLES, DISPERSION LIQUID THEREOF, METHOD FOR PRODUCING DISPERSION LIQUID, PHOTOCATALYST THIN FILM, AND MEMBER HAVING PHOTOCATALYST THIN FILM ON SURFACE

(71) Applicant: Shin-Etsu Chemical Co., Ltd., Tokyo (JP)

(72) Inventors: Manabu Furudate, Kamisu (JP); Tomohiro Inoue, Kamisu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 16/332,320

(22) PCT Filed: Aug. 30, 2017

(86) PCT No.: PCT/JP2017/031159
§ 371 (c)(1),
(2) Date: Mar. 11, 2019

(87) PCT Pub. No.: WO2018/047694
PCT Pub. Date: Mar. 15, 2018

(65) Prior Publication Data
US 2019/0217282 A1    Jul. 18, 2019

(30) Foreign Application Priority Data

Sep. 12, 2016    (JP) .............................. JP2016-177321

(51) Int. Cl.
| | | |
|---|---|---|
| *B01J 23/22* | (2006.01) | |
| *B01J 23/24* | (2006.01) | |
| *B01J 23/26* | (2006.01) | |
| *B01J 23/28* | (2006.01) | |
| *B01J 23/30* | (2006.01) | |
| *B01J 23/74* | (2006.01) | |
| *B01J 23/745* | (2006.01) | |
| *B01J 23/75* | (2006.01) | |
| *B01J 23/755* | (2006.01) | |
| *B01J 23/88* | (2006.01) | |
| *B01J 23/881* | (2006.01) | |

(Continued)

(52) U.S. Cl.
CPC .......... *B01J 35/1004* (2013.01); *B01J 23/22* (2013.01); *B01J 23/28* (2013.01); *B01J 23/30* (2013.01); *B01J 23/88* (2013.01); *B01J 23/888* (2013.01); *B01J 23/881* (2013.01); *B01J 23/888* (2013.01); *B01J 35/0013* (2013.01); *B01J 35/02* (2013.01); *B01J 37/0018* (2013.01); *B01J 37/0215* (2013.01); *B01J 37/0236* (2013.01); *B01J 37/03* (2013.01); *B01J 37/033* (2013.01); *B01J 37/04* (2013.01); *B01J 37/10* (2013.01); *B01J 37/12* (2013.01); *C01G 23/00* (2013.01); *C01G 31/00* (2013.01); *C01G 39/00* (2013.01); *C01G 41/00* (2013.01); *C01G 49/00* (2013.01)

(58) Field of Classification Search
CPC ... B01J 23/22; B01J 23/24; B01J 23/26; B01J 23/28; B01J 23/30; B01J 23/74; B01J 23/745; B01J 23/75; B01J 23/755; B01J 23/88; B01J 23/881; B01J 23/888; B01J 35/0013; B01J 35/004; B01J 35/02; B01J 37/0018; B01J 37/0215; B01J 37/0236; B01J 37/03; B01J 37/033; B01J 37/04; B01J 37/10; B01J 37/12; C01G 23/00; C01G 31/00; C01G 39/00; C01G 41/00; C01G 49/00

See application file for complete search history.

(56) References Cited

U.S. PATENT DOCUMENTS

| | | | |
|---|---|---|---|
| 5,759,948 A | | 6/1998 | Takaoka et al. |
| 6,106,955 A | * | 8/2000 | Ogawa .................. B01J 35/002 428/325 |

(Continued)

FOREIGN PATENT DOCUMENTS

| | | |
|---|---|---|
| JP | H07-303835 A | 11/1995 |
| JP | 2002-177775 A | 6/2002 |

(Continued)

OTHER PUBLICATIONS

International Search Report for PCT/JP2017/031159 (PCT/ISA/210) dated Nov. 21, 2017.

(Continued)

*Primary Examiner* — Cam N. Nguyen
(74) *Attorney, Agent, or Firm* — Birch, Stewart, Kolasch & Birch, LLP

(57) ABSTRACT

Provided are the following: a mixture of visible light-responsive photocatalytic titanium oxide fine particles which can conveniently produce a photocatalyst thin film that exhibits photocatalyst activity even with only visible light (400-800 nm) and that exhibits high transparency; a dispersion liquid of the fine particles; a method for producing the dispersion liquid; a photocatalyst thin film; and a member having the photocatalyst thin film on a surface thereof. The mixture of visible light-responsive photocatalytic titanium oxide fine particles is characterized by containing two kinds of titanium dioxide fine particles: first titanium oxide fine particles, in which a tin component and a transition metal component (excluding an iron group element component) that increases visible light response properties form a solid solution, and second titanium oxide fine particles, in which an iron group element component and a chromium group element component form a solid solution.

18 Claims, No Drawings

(51) Int. Cl.

| | | |
|---|---|---|
| *B01J 23/888* | (2006.01) | |
| *B01J 35/00* | (2006.01) | |
| *B01J 35/02* | (2006.01) | |
| *B01J 37/00* | (2006.01) | |
| *B01J 37/02* | (2006.01) | |
| *B01J 37/03* | (2006.01) | |
| *B01J 37/04* | (2006.01) | |
| *B01J 37/10* | (2006.01) | |
| *B01J 37/12* | (2006.01) | |
| *C01G 23/00* | (2006.01) | |
| *C01G 31/00* | (2006.01) | |
| *C01G 39/00* | (2006.01) | |
| *C01G 41/00* | (2006.01) | |
| *C01G 49/00* | (2006.01) | |
| *B01J 35/10* | (2006.01) | |

(56) References Cited

U.S. PATENT DOCUMENTS

| | | | | |
|---|---|---|---|---|
| 6,235,401 B1* | 5/2001 | Ogata | ............ | B01J 21/063 428/472 |
| 7,419,718 B2* | 9/2008 | Ogata | ............ | B01J 21/063 428/323 |
| 7,431,903 B2* | 10/2008 | Koyanagi | ............ | B01J 21/063 423/610 |
| 7,521,133 B2* | 4/2009 | Okada | ............ | B01D 53/8609 106/286.4 |
| 7,582,156 B2* | 9/2009 | Tanaka | ............ | B01J 21/063 106/286.4 |
| 7,754,648 B2* | 7/2010 | Tsujmichi | ............ | B01J 21/063 502/263 |
| 7,799,732 B2* | 9/2010 | Tanaka | ............ | B01J 23/00 502/350 |
| 7,855,161 B2* | 12/2010 | Aso | ............ | D06M 23/08 502/300 |
| 7,858,201 B2* | 12/2010 | Masaki | ............ | B01J 35/004 428/469 |
| 8,158,270 B2* | 4/2012 | Ogata | ............ | C09C 1/36 428/472 |
| 8,518,174 B2* | 8/2013 | Ogata | ............ | C09C 1/3653 106/436 |
| 8,728,973 B2* | 5/2014 | Hashimoto | ............ | B01J 23/30 502/309 |
| 9,604,198 B2* | 3/2017 | Furudate | ............ | B01J 35/004 |
| 2005/0271892 A1* | 12/2005 | Ogata | ............ | B01J 37/0244 428/632 |
| 2006/0105911 A1* | 5/2006 | Nakamura | ............ | C03C 17/007 502/345 |
| 2009/0239738 A1* | 9/2009 | Okada | ............ | B01J 37/0238 502/227 |
| 2011/0198210 A1 | 8/2011 | Hashimoto et al. | | |
| 2012/0043506 A1* | 2/2012 | Ogata | ............ | C09C 1/3607 252/397 |
| 2012/0045655 A1* | 2/2012 | Ogata | ............ | B01J 35/004 428/469 |
| 2012/0214667 A1 | 8/2012 | Furudate et al. | | |
| 2013/0192976 A1 | 8/2013 | Sambandan et al. | | |
| 2014/0011674 A1* | 1/2014 | Tsai | ............ | B01J 35/002 502/330 |
| 2015/0273440 A1 | 10/2015 | Furudate et al. | | |

FOREIGN PATENT DOCUMENTS

| | | |
|---|---|---|
| JP | 2009-148700 A | 7/2009 |
| JP | 2010-104913 A | 5/2010 |
| JP | 2011-240247 A | 12/2011 |
| JP | 2012-210632 A | 11/2012 |
| JP | 2016-059920 A | 4/2016 |
| JP | 2016-068080 A | 5/2016 |
| KR | 10-2005-0050740 A | 6/2005 |
| WO | WO 2011/145385 A1 | 11/2011 |
| WO | WO 2014/045861 A1 | 3/2014 |
| WO | WO 2016/152487 A1 | 9/2016 |

OTHER PUBLICATIONS

Written Opinion of the International Searching Authority for PCT/JP2017/031159 (PCT/ISA/237) dated Nov. 21, 2017.
Extended European Search Report dated Apr. 15, 2020 for Application No. 17848634.6.

* cited by examiner

MIXTURE OF VISIBLE LIGHT-RESPONSIVE PHOTOCATALYTIC TITANIUM OXIDE FINE PARTICLES, DISPERSION LIQUID THEREOF, METHOD FOR PRODUCING DISPERSION LIQUID, PHOTOCATALYST THIN FILM, AND MEMBER HAVING PHOTOCATALYST THIN FILM ON SURFACE

TECHNICAL FIELD

The present invention relates to a visible light-responsive photocatalytic titanium oxide fine particle mixture, a dispersion thereof, a method for preparing the dispersion, a photocatalytic thin film formed using the dispersion, and a member having the photocatalytic thin film formed thereon. More particularly, the invention relates to a visible light-responsive photocatalytic titanium oxide fine particle mixture which can easily produce a photocatalytic thin film that has a high transparency and manifests a photocatalytic activity even under visible light (400 to 800 nm) alone, a dispersion thereof, a method for preparing the dispersion, a photocatalytic thin film, and a member having the photocatalytic thin film on the surface.

BACKGROUND ART

Photocatalytic titanium oxide fine particles are frequently used in such applications as the cleaning, deodorization and disinfection of substrate surfaces. As used herein, "photocatalytic reaction" refers to a reaction caused by excited electrons and holes generated due to the absorption of light by titanium oxide. The decomposition of organic matter is thought to arise primarily by the following mechanisms: (1) the excited electrons and holes that have formed carry out oxidation-reduction reactions with oxygen and water adsorbed on the titanium oxide surface, generating active species, which decompose organic matter; and (2) the holes that have formed directly oxidize and decompose organic matter adsorbed on the titanium oxide surface.

Studies have been carried out recently which attempt to apply such photocatalysis not only to outdoor uses where ultraviolet light can be utilized, but also to indoor spaces illuminated with light sources such as fluorescent lamps that emit primarily visible-spectrum light (wavelength, 400 to 800 nm). For example, a tungsten oxide photocatalytic body has been disclosed as a visible light-responsive photocatalyst (JP-A 2009-148700; Patent Document 1), but because tungsten is a scarce element, there exists a desire for improvements in the visible light activity of photocatalysts that utilize the widely available element titanium.

Methods for increasing the visible light activity of photocatalysts which use titanium oxide include methods that entail supporting iron or copper on the surface of titanium oxide fine particles or metal-doped titanium oxide fine particles (see, for example, JP-A 2012-210632: Patent Document 2; JP-A 2010-104913: Patent Document 3; JP-A 2011-240247: Patent Document 4; and JP-A H07-303835: Patent Document 5); and a method which separately prepares titanium oxide fine particles containing in solid solution (i.e., doped with) tin and a transition metal that increases the visible light activity and titanium oxide fine particles containing copper in solid solution, and then uses these separately prepared particles in admixture (WO 2014/045861: Patent Document 6).

The latter of these methods (Patent Document 6), that is, the method which separately prepares titanium oxide fine particles containing in solid solution tin and a transition metal that increases the visible light activity and titanium oxide fine particles containing copper in solid solution and then uses these separately prepared particles in admixture, has the advantage that because the metals other than titanium that are used are all contained in solid solution in the titanium oxide fine particles, the particles are stable and do not readily deteriorate, enabling a photocatalytic thin film of high durability to be obtained.

PRIOR ART DOCUMENTS

Patent Documents

Patent Document 1: JP-A 2009-148700
Patent Document 2: JP-A 2012-210632
Patent Document 3: JP-A 2010-104913
Patent Document 4: JP-A 2011-240247
Patent Document 5: JP-A H07-303835
Patent Document 6: WO 2014/045861

SUMMARY OF INVENTION

Technical Problem

In light of the above circumstances, one object of this invention is to provide, by combining and mixing together titanium oxide fine particles containing different transition metals in solid solution, a visible light-responsive photocatalytic titanium fine particle mixture capable of achieving a high visible light activity of a type differing from that in the prior art. Further objects are to provide a dispersion thereof, a method for preparing the dispersion, a photocatalytic thin film formed using the dispersion, and a member having the photocatalytic thin film on the surface thereof.

Solution to Problem

One approach taken by the inventors to achieve the above objects has been to conduct a search for new materials which exhibit a high photocatalytic activity under visible light-only condition by varying the second type of titanium oxide fine particle that is combined with, as the first type of titanium oxide fine particle used in Patent Document 6 being titanium oxide fine particle containing in solid solution both tin and a transition metal that increases the visible light activity. The titanium oxide fine particle containing a copper constituent in solid solution which serves as the second type of titanium oxide fine particle used in Patent Document 4 exhibits some photocatalytic activity even under visible light (400 to 800 nm) only condition. However, in the course of this investigation, the inventors have made the unexpected discovery that when titanium oxide fine particle containing an iron-group element constituent in solid solution, which hardly exhibits photocatalytic activity under visible light-only condition, is included as the second type of titanium oxide fine particle, under visible light-only condition, a photocatalytic activity is exhibited which is as high as that obtained with the use of titanium oxide fine particle containing a copper constituent in solid solution.

The inventors have conducted further detailed investigations on cases in which titanium oxide fine particle containing this iron-group element constituent in solid solution is included as the second type of titanium oxide fine particle, whereupon they have learned that when acetaldehyde gas present within air is decomposed under visible light, a to decomposition activity can be obtained even in a low-concentration region where such activity has been difficult to achieve with prior-art materials, and that it is possible, within a significant length of time under visible light condition, to lower the level to 0.03 ppm or below, which is the indoor concentration guideline value for a chemical substance (acetaldehyde) within indoor air established by the Japanese Ministry of Health, Labor and Welfare. They have also found that the decomposition activity rises when a chromium-group element constituent is additionally included in solid solution in the titanium oxide fine particle containing an iron-group element constituent in solid solution. That is, the inventors have discovered that, by using a photocatalytic film formed using a visible light-responsive photocatalytic titanium oxide fine-particle dispersion containing both a first type of titanium oxide fine particle that contains in solid solution tin and a transition metal which increases visible light activity and a second type of titanium oxide fine particle that contains in solid solution an iron-group element constituent and a chromium-group element constituent, even in cases where the substrate to be decomposed is at a low concentration that has heretofore been difficult to decompose under visible light condition, a high decomposition activity can be obtained.

Accordingly, this invention provides the following visible light-responsive photocatalytic titanium oxide fine particle mixture, dispersion thereof, method for preparing the dispersion, and member having on the surface thereof the photocatalytic thin film formed using the dispersion.

[1]
A visible light-responsive photocatalytic titanium oxide fine particle mixture containing two types of titanium oxide fine particles: a first type of titanium oxide fine particle containing in solid solution a tin constituent and a transition metal constituent (exclusive of an iron-group element constituent) that increases visible light responsiveness, and a second type of titanium oxide fine particle containing in solid solution an iron-group element constituent and a chromium-group element constituent.

[2]
The visible light-responsive photocatalytic titanium oxide fine particle mixture of [1], wherein the first type of titanium oxide fine particle and the second type of titanium oxide fine particle have a mixing ratio therebetween, expressed as the weight ratio [(first type of titanium oxide fine particle)/(second type of titanium oxide fine particle)], of from 99 to 0.01.

[3]
The visible light-responsive photocatalytic titanium oxide fine particle mixture of [1] or [2], wherein the amount of the tin constituent included in the first type of titanium oxide fine particle, expressed as a molar ratio with titanium (Ti/Sn), is from 1 to 1,000.

[4]
The visible light-responsive photocatalytic titanium oxide fine particle mixture of any of [1] to [3], wherein the transition metal constituent contained in solid solution in the first type of titanium oxide fine particle is at least one selected from the group consisting of vanadium, chromium, manganese, niobium, molybdenum, rhodium, antimony, tungsten and cerium.

[5]
The visible light-responsive photocatalytic titanium oxide fine particle mixture of [4], wherein the transition metal constituent contained in solid solution in the first type of titanium oxide fine particle is at least one selected from the group consisting of molybdenum, tungsten and vanadium.

[6]
The visible light-responsive photocatalytic titanium oxide fine particle mixture of [5], wherein the amount of the molybdenum or tungsten constituent included in the first type of titanium oxide fine particle, expressed as a molar ratio with titanium (Ti/Mo or Ti/W), is from 1 to 1,000.

[7]
The visible light-responsive photocatalytic titanium oxide fine particle mixture of [5], wherein the amount of the vanadium constituent included in the first type of titanium oxide fine particle, expressed as a molar ratio with titanium (Ti/V), is from 10 to 10,000.

[8]
The visible light-responsive photocatalytic titanium oxide fine particle mixture of any of [1] to [7], wherein the amount of the iron-group element constituent included in the second type of titanium oxide fine particle, expressed as a molar ratio with titanium (Ti/iron group element), is from 1 to 1,000.

[9]
The visible light-responsive photocatalytic titanium oxide fine particle mixture of any of [1] to [8], wherein the iron-group element constituent contained in solid solution in the second type of titanium oxide fine particle is an iron constituent.

[10]
The visible light-responsive photocatalytic titanium oxide fine particle mixture of any of [1] to [9], wherein the amount of the chromium-group element constituent included in the second type of titanium oxide fine particle, expressed as a molar ratio with titanium (Ti/chromium-group element), is from 1 to 1,000.

[11]
The visible light-responsive photocatalytic titanium oxide fine particle mixture of any of [1] to [10], wherein the chromium-group element constituent contained in solid solution in the second type of titanium oxide fine particle is at least one selected from the group consisting of a molybdenum constituent and a tungsten constituent.

[12]
A visible light-responsive photocatalytic titanium oxide fine particle dispersion comprising two types of titanium oxide fine particles dispersed in an aqueous dispersion medium: a first type of titanium oxide fine particle containing in solid solution a tin constituent and a transition metal constituent (exclusive of an iron-group element constituent) that increases visible light responsiveness, and a second type of titanium oxide fine particle containing in solid solution an iron-group element constituent and a chromium-group element constituent.

[13]
The visible light-responsive photocatalytic titanium oxide fine particle dispersion of [12], further including a binder.

[14]
The visible light-responsive photocatalytic titanium oxide fine particle dispersion of [13], wherein the binder is a silicon compound-based binder.

[15]
A photocatalytic thin film comprising the visible light-responsive photocatalytic titanium oxide fine particle mixture of any of [1] to [11].

[16]
The photocatalytic thin film of [15], further including a binder.

[17]
A member in which the photocatalytic thin film of [15] or [16] is formed on the substrate surface.

[18]
A method for preparing a visible light-responsive photocatalytic titanium oxide fine particle dispersion, comprising the steps of:

(1) preparing a tin and transition metal constituent-containing peroxotitanic acid solution from a starting titanium compound, a tin compound, a transition metal compound (exclusive of an iron-group element compound), a basic substance, a hydrogen peroxide and an aqueous dispersion medium;

(2) preparing a tin and transition metal constituent-containing titanium oxide fine particle dispersion by heating at between 80° C. and 250° C. and under pressure control the tin and transition metal constituent-containing peroxotitanic acid solution obtained in Step (1);

(3) preparing an iron-group element and chromium-group element constituent-containing peroxotitanic acid solution from a starting titanium compound, an iron-group element compound, a chromium-group element compound, a basic substance, hydrogen peroxide and an aqueous dispersion medium;

(4) preparing an iron-group element and chromium-group element constituent-containing titanium oxide fine particle dispersion by heating at between 80° C. and 250° C. and under pressure control the iron-group element and chromium-group element constituent-containing peroxotitanic acid solution obtained in Step (3); and (5) mixing together the two types of titanium oxide fine particle dispersions prepared in Steps (2) and (4).

Advantageous Effects of Invention

This invention makes it possible to provide a visible light-responsive photocatalytic titanium oxide fine particle mixture which can easily produce a photocatalytic thin film that has a high transparency and manifests a photocatalytic activity even under visible light (400 to 800 nm) alone, a dispersion thereof, a method for preparing the dispersion, and a member having on the surface thereof the photocatalytic thin film formed using the dispersion.

DESCRIPTION OF EMBODIMENTS

The inventive visible light-responsive photocatalytic titanium oxide fine particle mixture, dispersion thereof, method for preparing the dispersion, and member having on the surface thereof the photocatalytic thin film are described more fully below.

The visible light-responsive photocatalytic titanium oxide fine particle mixture of the invention is a mixture that includes titanium oxide fine particles of mutually differing compositions which are referred to herein as a first type of titanium oxide fine particle and a second type of titanium oxide fine particle. It is desirable in particular to use this mixture as a dispersion.

<Visible Light-Responsive Photocatalytic Titanium Oxide Fine Particle Dispersion>

The visible light-responsive photocatalytic titanium oxide fine particle dispersion of the invention is made up of titanium oxide fine particles of mutually differing compositions, namely a "first type" of titanium oxide fine particle and a "second type" of titanium oxide fine particle, those are dispersed in an aqueous dispersion medium. Titanium oxide fine particle of the first type is titanium oxide fine particle containing in solid solution a tin constituent and a transition metal constituent (exclusive of an iron-group element constituent). Titanium oxide fine particle of the second type is titanium oxide fine particle containing in solid solution an iron-group element constituent and a chromium-group element constituent.

As used herein, "solid solution" refers to a phase in which an atom at a lattice point of one crystal phase is substituted with another atom or in which another atom is entered into the lattice interstice, that is, it refers to a mixed phase in which another substance is regarded as dissolved in a certain crystal phase, and is a homogeneous phase as the crystal phase. A solid solution in which a solvent atom at lattice point is substituted with a solute atom is called a "substituted solid solution", and a solid solution in which a solute atom is entered into the lattice interstice is called an "interstitial solid solution". Here, "solid solution" may refer to either of these.

The titanium oxide fine particles of the invention are characterized in that the first type of titanium oxide fine particle forms a solid solution with at least some of the tin and transition metal atoms (exclusive of an iron-group element constituent) and the second type of titanium oxide fine particle forms a solid solution with at least some of the iron-group element constituent and the chromium-group element constituent. The solid solution may be either a substituted solid solution or an interstitial solid solution. A substituted solid solution is one that is formed by the substitution of titanium sites in the titanium oxide crystals with various metal atoms, and an interstitial solid solution is one that is formed with the introduction of various metal atoms into lattice interstices in the titanium oxide crystals. When various metal atoms enter into solid solution in titanium oxide, only peaks of the crystal phases of titanium oxide are observed in measurement of the crystal phase by x-ray diffraction analysis or the like, and the peaks of compounds derived from the various metal atoms added are not observed.

Methods of forming solid solutions of different metals in metal oxide crystals include, without particular limitation, vapor phase methods (e.g., chemical vapor deposition method, physical vapor deposition method), liquid phase methods (e.g., hydrothermal method, sol-gel method), and solid phase methods (e.g., high-temperature firing method).

Titanium oxide fine particles are generally known to have three crystal phases: rutile, anatase and brookite. It is preferable to use chiefly rutile and anatase in the first and second type of titanium oxide fine particle. In particular, it is preferable for the first type of titanium oxide fine particle to be chiefly rutile and it is preferable for the second type of titanium oxide fine particle to be chiefly anatase. "Chiefly" here means generally at least 50 wt %, preferably at least 70 wt %, and more preferably at least 90 wt %, and may even be 100 wt %, of all the titanium oxide fine-particle crystals.

The dispersion medium used in the dispersion is typically an aqueous solvent, with the use of water being preferred, although a mixed solvent of water and a hydrophilic organic solvent that mixes with water in any ratio may be used. The water is preferably, for example, deionized water, distilled water or purified water. The hydrophilic organic solvent is preferably, for example, an alcohol such as methanol, ethanol or isopropanol; a glycol such as ethylene glycol; or a glycol ether such as ethylene glycol monomethyl ether, ethylene glycol monoethyl ether or propylene glycol-n-propyl ether. When a mixed solvent is used, the ratio of hydrophilic organic solvent in the mixed solvent is preferably more than 0 wt % and not more than 50 wt %, more preferably not more than 20 wt %, and even more preferably not more than 10 wt %.

The first type of titanium oxide fine particle is a titanium oxide fine particle which contains in solid solution a tin constituent and a transition metal constituent other than iron group constituent that increases the visible light activity. Transition metals are elements selected from among Groups 3 to 11 of the Periodic Table. The transition metal constituent that increases the visible light responsiveness is preferably selected from among vanadium, chromium, manganese, niobium, molybdenum, rhodium, antimony, tungsten and cerium. Of these, the selection of molybdenum, tungsten or vanadium is preferred.

The tin constituent that forms a solid solution in the first type of titanium oxide fine particle is used to increase the visible light responsiveness of photocatalytic thin films, and may be any tin constituent derived from a tin compound, such as tin metal (Sn), oxides ($SnO$, $SnO_2$), hydroxides, chlorides ($SnCl_2$, $SnCl_4$), nitrates ($Sn(NO_3)_2$), sulfates ($SnSO_4$), halides and complex compounds. These may be used singly or two or more may be used in combination. Of these, the use of oxides ($SnO$, $SnO_2$), chlorides ($SnCl_2$, $SnCl_4$) or sulfates ($SnSO_4$) is preferred.

The amount of tin constituent included in the first type of titanium oxide fine particle, expressed as a molar ratio with titanium (Ti/Sn), is from 1 to 1,000, preferably from 2 to 500, and more preferably from 5 to 100. When the molar ratio is less than 1, the titanium oxide content decreases and a sufficient photocatalytic effect may not be exhibited. When the molar ratio is greater than 1,000, the visible light responsiveness may be inadequate.

The transition metal constituent contained in solid solution in the first type of titanium oxide fine particle may be any derived from a compound of the transition metal, such as the metal, oxides, hydroxides, chlorides, nitrates, sulfates, halides and various complex compounds. These may be used singly or two or more may be used together.

The amount of the transition metal constituent included in the first type of titanium oxide fine particle may be suitably selected according to the type of transition metal constituent. However, the amount, expressed as the molar ratio with titanium (Ti/transition metal), is preferably in the range of 1 to 10,000, and especially the range of 5 to 1,000.

Here, when molybdenum is selected as the transition metal constituent to be included in solid solution in the first type of titanium oxide fine particle, the molybdenum constituent may be any that is derived from molybdenum compounds, and is exemplified by molybdenum metal (Mo), oxides ($MoO_2$, $MoO_3$), molybdic acid and salts thereof ($H_2MoO_4$, $Na_2MoO_4$), hydroxides, chlorides ($MoCl_3$, $MoCl_5$), nitrates, sulfates, halides and complex compounds. These may be used singly or two or more may be used in combination. Of these, the use of oxides ($MoO_2$, $MoO_3$) or chlorides ($MoCl_3$, $MoCl_5$) is preferred.

The amount of the molybdenum constituent included in the first type of titanium oxide fine particle, expressed as the molar ratio with titanium (Ti/Mo), is from 1 to 1,000, preferably from 2 to 100, and more preferably from 2 to 50. The reason for this range is that at a molar ratio below 1, the titanium oxide content becomes low and a sufficient photocatalytic effect may not be exhibited, and at a molar ratio greater than 1,000, the visible light responsiveness may be inadequate and a high decomposition activity at low acetaldehyde concentrations may not be obtained.

When tungsten is selected as the transition metal constituent to be included in solid solution in the first type of titanium oxide fine particle, the tungsten constituent may be any that is derived from tungsten compounds, and is exemplified by tungsten metal (W), oxides ($WO_3$), tungstic acid and salts thereof ($H_2WO_4$, $Na_2WO_4$, $K_2WO_4$), hydroxides, chlorides ($WCl_4$, $WCl_6$), nitrates, sulfates, halides and complex compounds. These may be used singly or two or more may be used in combination. Of these, the use of oxides ($WO_3$), tungstic acid and salts thereof ($H_2WO_4$, $Na_2WO_4$, $K_2WO_4$), and chlorides ($WCl_4$, $WCl_6$) is preferred.

The amount of the tungsten constituent included in the first type of titanium oxide fine particle, expressed as the molar ratio with titanium (Ti/W), is from 1 to 1,000, preferably from 2 to 100, and more preferably from 2 to 50. The reason for this range is that at a molar ratio below 1, the titanium oxide content becomes low and a sufficient photocatalytic effect may not be exhibited, and at a molar ratio greater than 1,000, the visible light responsiveness may be inadequate and a high decomposition activity at low acetaldehyde concentrations may not be obtained.

When vanadium is selected as the transition metal constituent to be included in solid solution in the first type of titanium oxide fine particle, the vanadium constituent may be any that is derived from vanadium compounds, and is exemplified by vanadium metal (V), oxides (VO, $V_2O_3$, $VO_2$, $V_2O_5$), hydroxides, chlorides ($VCl_5$), oxychloride ($VOCl_3$), nitrates, sulfates, oxysulfate ($VOSO_4$), halides and complex compounds. These may be used singly or two or more may be used in combination. Of these, the use of oxides ($V_2O_3$, $V_2O_5$), chlorides ($VCl_5$), oxychloride ($VOCl_3$) or oxysulfate ($VOSO_4$) is preferred.

The amount of the vanadium constituent included in the first type of titanium oxide fine particle, expressed as the molar ratio with titanium (Ti/V), is from 10 to 10,000, preferably from 100 to 10,000, and more preferably from 100 to 5,000. The reason for this range is that at a molar ratio below 10, the titanium oxide crystal content becomes low and a sufficient photocatalytic effect may not be exhibited, and at a molar ratio greater than 10,000, the visible light responsiveness may be inadequate and a high decomposition activity at low acetaldehyde concentrations may not be obtained.

A plurality of elements from among molybdenum, tungsten and vanadium may be selected as the transition metal constituent contained in solid solution in the first type of titanium oxide fine particle. Their respective amounts in this case may be selected from the above ranges, provided that the molar ratio between the sum of these amounts and the amount of titanium, expressed as [Ti/(Mo+W+V)], is at least 1 and less than 10,000.

The first type of titanium oxide fine particle may be of one kind used alone, or may be of two or more kinds used in combination. When two or more kinds having differing visible light responsivenesses are combined, a visible light activity-increasing effect may be obtained.

The second type of titanium oxide fine particle has a composition that differs from that of the first type of titanium oxide fine particle and is characterized by containing in solid solution an iron-group element constituent and a chromium-group element constituent. The general form is one which, unlike the first type of titanium oxide fine particle, includes no transition metal other than an iron-group element constituent and a chromium-group element constituent, and includes also no tin.

The iron group metal contained in solid solution in the second type of titanium oxide fine particle is exemplified by iron, cobalt and nickel. Of these, iron is preferred.

The chromium group metal contained in solid solution in the second type of titanium oxide fine particle is exemplified by chromium, molybdenum and tungsten. Of these, molybdenum and tungsten are preferred.

The iron-group element constituent contained in solid solution in the second type of titanium oxide fine particle may be any that is derived from iron-group element compounds, such as iron metal (Fe), oxides ($Fe_2O_3$, $Fe_3O_4$), hydroxides (FeO(OH)), chlorides ($FeCl_2$, $FeCl_3$), nitrates ($Fe(NO_3)_3$), sulfates ($FeSO_4$, $Fe_2(SO_4)_3$), halides and complex compounds. These may be used singly or two or more may be used in combination. Of these, the use of oxides ($Fe_2O_3$, $Fe_3O_4$), hydroxides (FeO(OH)), chlorides ($FeCl_2$, $FeCl_3$), nitrates ($Fe(NO_3)_3$) and sulfates ($FeSO_4$, $Fe_2(SO_4)_3$) is preferred.

The amount of the iron-group element constituent included in the second type of titanium oxide fine particle, expressed as the molar ratio with titanium (Ti/iron group element), is from 1 to 1,000, preferably from 2 to 200, and more preferably from 5 to 100. The reason for this range is that at a molar ratio below 1, the titanium oxide content becomes low and a sufficient photocatalytic effect may not be exhibited, and at a molar ratio greater than 1,000, the visible light responsiveness may be inadequate.

When molybdenum is selected as the chromium-group element constituent to be included in solid solution in the second type of titanium oxide fine particle, the molybdenum constituent may be any that is derived from molybdenum compounds, and is exemplified by molybdenum metal (Mo), oxides ($MoO_2$, $MoO_3$), molybdic acid and salts thereof ($H_2MoO_4$, $Na_2MoO_4$), hydroxides, chlorides ($MoCl_3$, $MoCl_5$), nitrates, sulfates, halides and complex compounds. These may be used singly or two or more may be used in combination. Of these, the use of oxides ($MoO_2$, $MoO_3$) and chlorides ($MoCl_3$, $MoCl_5$) is preferred.

The amount of the molybdenum constituent included in the second type of titanium oxide fine particle, expressed as the molar ratio with titanium (Ti/Mo), is from 1 to 1,000, preferably from 2 to 100, and more preferably from 2 to 50. The reason for this range is that at a molar ratio below 1, the titanium oxide content becomes low and a sufficient photocatalytic effect may not be exhibited, and at a molar ratio greater than 1,000, the visible light responsiveness may be inadequate and a high decomposition activity at low acetaldehyde concentrations may not be obtained.

When tungsten is selected as the chromium-group element constituent to be included in solid solution in the second type of titanium oxide fine particle, the tungsten constituent may be any that is derived from tungsten compounds, and is exemplified by tungsten metal (W), oxides ($WO_3$), tungstic acid and salts thereof ($H_2WO_4$, $Na_2WO_4$, $K_2WO_4$), hydroxides, chlorides ($WCl_4$, $WCl_6$), nitrates, sulfates, halides and complex compounds. These may be used singly or two or more may be used in combination. Of these, the use of oxides ($WO_3$), tungstic acid and salts thereof ($H_2WO_4$, $Na_2WO_4$, $K_2WO_4$), and chlorides ($WCl_4$, $WCl_6$) is preferred. When molybdenum or tungsten is used as the transition metal in the first type of titanium oxide fine particle, it is even more desirable to use molybdenum or tungsten as the chromium-group element in the second type of titanium oxide fine particle as well.

The amount of the tungsten constituent included in the second type of titanium oxide fine particle, expressed as the molar ratio with titanium (Ti/W), is from 1 to 1,000, preferably from 2 to 100, and more preferably from 2 to 50. The reason for this range is that at a molar ratio below 1, the titanium oxide content becomes low and a sufficient photocatalytic effect may not be exhibited, and at a molar ratio greater than 1,000, the visible light responsiveness may be inadequate and a high decomposition activity at low acetaldehyde concentrations may not be obtained.

It is preferable to select molybdenum and/or tungsten as the chromium-group element constituent that is contained in solid solution in the second type of titanium oxide fine particle, the molar ratio between the titanium and the sum of the respective amounts of the chromium, molybdenum and tungsten constituents, expressed as [Ti/(total amount of chromium-group elements)], being at least 1 and up to 1,000. The second type of titanium oxide fine particle may be of one kind used alone, or may be of two or more kinds used in combination. When two or more kinds having differing visible light responsivenesses are combined, a visible light activity-increasing effect may be obtained.

The first type of titanium oxide fine particle and second type of titanium oxide fine particle in the visible light-responsive photocatalytic titanium oxide fine particle mixture have a volume-based 50% cumulative distribution size ($D_{50}$) measured by dynamic laser light scattering (which size is also referred to below as the "average particle size") of preferably from 5 to 30 nm, and more preferably from 5 to 20 nm. This is because, at an average particle size below 5 nm, the photocatalytic activity may be inadequate, and at more than 30 nm, the dispersion may become opaque. Instruments that may be used to measure the average particle size include, for example, the Nanotrac UPA-EX150 (Nikkiso Co., Ltd.) and the LA-910 (Horiba, Ltd.).

The first type of titanium oxide fine particle and the second type of titanium oxide fine particle included in the visible light-responsive photocatalytic titanium oxide fine particle mixture have a mixing ratio therebetween, expressed as the weight ratio [(first type of titanium oxide fine particle)/(second type of titanium oxide fine particle)], of preferably from 99 to 0.01, more preferably from 19 to 0.05, and even more preferably from 10 to 0.5. This is because, at a weight ratio in excess of 99 or below 0.01, the visible light activity may be inadequate.

From the standpoint of the ease of forming a photocatalytic thin film of the required thickness, the total concentration of the first type of titanium oxide fine particle and the second type of titanium oxide fine particle in the visible light-responsive photocatalytic titanium oxide fine particle dispersion is preferably from 0.01 to 20 wt %, and especially from 0.5 to 10 wt %.

In addition, a binder may be added to the visible light-responsive photocatalytic titanium oxide fine particle dispersion, both for the purpose of making the dispersion easier to apply to the surfaces of the subsequently described various types of members and also to make the fine particles readily adhering. Examples of binders include metal compound-based binders that include silicon, aluminum, titanium, zirconium or the like, and organic resin-based binders that include a fluoroplastic, an acrylic resin, a urethane resin or the like.

The binder is added and used in a weight ratio between the binder and the titanium oxide, expressed as (binder/titanium oxide), of preferably from 0.01 to 99, more preferably from 0.1 to 9, and even more preferably from 0.4 to 2.5. The reason is that, at a weight ratio below 0.01, adherence of the titanium oxide fine particle to the surfaces of various types of members may be inadequate, and at a weight ratio above 99, the visible light activity may be inadequate.

In particular, to obtain an excellent photocatalytic thin film having a high photocatalysis and high transparency, it is especially desirable for a silicon compound-based binder to be added and used in a compounding ratio (weight ratio between silicon compound and titanium oxide) of preferably from 1:99 to 99:1, more preferably from 10:90 to 90:10, and even more preferably from 30:70 to 70:30. Here, "silicon compound-based binder" refers to a colloidal dispersion, solution or emulsion of a silicon compound that is obtained by including a solid or liquid silicon compound in an aqueous dispersion medium. Illustrative examples include colloidal silica (preferred particle size, 1 to 150 nm); solutions of silicates; silane and siloxane hydrolyzate emulsions; silicone resin emulsions; and emulsions of copolymers of a silicone resin with another resin, such as silicone-acrylic resin copolymers and silicone-urethane resin copolymers.

<Method for Preparing Visible Light-Responsive Photocatalytic Titanium Oxide Fine Particle Dispersion>

The visible light-responsive photocatalytic titanium oxide fine particle dispersion of the invention is produced by respectively preparing a dispersion of the first type of titanium oxide fine particle (first titanium oxide fine particle dispersion) and a dispersion of the second type of titanium oxide fine particle (second titanium oxide fine particle dispersion), and then mixing together the first titanium oxide fine particle dispersion and the second titanium oxide fine particle dispersion.

The production method is exemplified by a method that includes the following Steps (1) to (5):

(1) preparing a tin and transition metal constituent-containing peroxotitanic acid solution from a starting titanium compound, a tin compound, a transition metal compound (exclusive of an iron-group element compound), a basic substance, hydrogen peroxide and an aqueous dispersion medium;
(2) preparing a tin and transition metal constituent-containing titanium oxide fine particle dispersion by heating the tin and transition metal constituent-containing peroxotitanic acid solution prepared in Step (1) at between 80° C. and 250° C. and under pressure control;
(3) preparing an iron-group element and chromium-group element constituent-containing peroxotitanic acid solution from a starting titanium compound, an iron-group element compound, a chromium-group element compound, a basic substance, hydrogen peroxide and an aqueous dispersion medium;
(4) preparing an iron-group element and chromium-group element constituent-containing titanium oxide fine particle dispersion by heating the iron-group element and chromium-group element constituent-containing peroxotitanic acid solution prepared in Step (3) at between 80° C. and 250° C. and under pressure control; and
(5) mixing together the two types of titanium oxide fine particle dispersions prepared in Steps (2) and (4).

Steps (1) to (2) are steps for obtaining the first titanium oxide fine particle dispersion, Steps (3) to (4) are steps for obtaining the second titanium oxide fine particle dispersion, and Step (5) is a final step for obtaining a dispersion containing both the first type of titanium oxide fine particle and the second type of titanium oxide fine particle.

Because it is preferable, as already mentioned, to use at least one compound from among molybdenum compounds, tungsten compounds and vanadium compounds as the transition metal compound employed in Step (1), the respective steps are described in detail below with this in mind.

Step (1):

In Step (1), a transition metal and tin constituent-containing peroxotitanic acid solution is prepared by reacting a starting titanium compound, a transition metal compound (exclusive of an iron-group element compound; the same applies below), a tin compound, a basic substance and a hydrogen peroxide in an aqueous dispersion medium.

The reaction method may be either a method that adds the basic substance to the starting titanium compound in the aqueous dispersion medium to form titanium hydroxide, removes impurity ions other than the metallic ions to be included, adds hydrogen peroxide to form peroxotitanic acid, and then adds the transition metal compound and the tin compound, thereby giving a transition metal and tin constituent-containing peroxotitanic acid; or a method that adds the transition metal compound and the tin compound to the starting titanium compound and the basic substance in an aqueous dispersion medium and effects dissolution so as to form a transition metal and tin constituent-containing titanium hydroxide, removes impurity ions other than the metallic ions to be included, and subsequently adds hydrogen peroxide, thereby giving a transition metal and tin constituent-containing peroxotitanic acid.

Moreover, in the first stage of the latter method, the starting titanium compound and the basic substance in the aqueous dispersion medium may be separated into two aqueous dispersion media (two liquids), such as an aqueous dispersion medium in which the starting titanium compound is dispersed and an aqueous dispersion medium in which the basic substance is dispersed, and the transition metal compound and the tin compound may be dissolved in one or both of these two liquids, depending on the solubilities of these respective compounds in the two liquids, after which both solutions may be mixed together.

After a transition metal and tin constituent-containing peroxotitanic acid solution is thus obtained, the solution is furnished to the hydrothermal reaction in subsequently described Step (2), thereby enabling titanium oxide fine particles in which these respective metals are present in solid solution in titanium oxide to be obtained.

Examples of the starting titanium compound include inorganic acid salts of titanium, such as chlorides, nitrates, and sulfates; organic acid salts such as the titanium salts of formic acid, citric acid, oxalic acid, lactic acid and glycolic acid; and the titanium hydroxide that settles out when hydrolysis is carried out by adding an alkali to aqueous solutions of these. Such starting titanium compounds may be used singly or two or more may be used in combination. Of these, the use of titanium chlorides ($TiCl_3$, $TiCl_4$) is preferred.

The transition metal compound, the tin compound and the aqueous dispersion medium, each of which has been described above, are used in such a way as to achieve the above-described formulation. The concentration of the aqueous solution of starting titanium compound formed of the starting titanium compound and the aqueous dispersion medium is preferably 60 wt % or less, and more preferably 30 wt % or less. The concentration lower limit is set as appropriate, although a concentration of at least 1 wt % is generally preferred.

The purpose of the basic substance is to smoothly convert the starting titanium compound into titanium hydroxide. Illustrative examples include hydroxides of alkali metals or alkaline earth metals, such as sodium hydroxide and potassium hydroxide; and amine compounds such as ammonia, alkanolamines and alkylamines. The basic substance is added and used in an amount such as to bring the pH of the aqueous solution of the starting titanium compound to 7 or above, and especially from 7 to 10. The basic substance may be used together with the aqueous dispersion medium after first being rendered into an aqueous solution of a suitable concentration.

The purpose of the hydrogen peroxide is to convert the starting titanium compound or titanium hydroxide into a peroxotitanium, that is, a titanium oxide compound containing a Ti—O—O—Ti bond, and is typically used in the form of hydrogen peroxide water. The amount of hydrogen peroxide added is preferably set to from 1.5 to 20 times moles per the total moles of transition metal, vanadium and tin combined. When adding hydrogen peroxide and converting the starting titanium compound or titanium hydroxide into peroxotitanic acid, the reaction temperature is preferably set to between 5° C. and 80° C. and the reaction time is preferably set to from 30 minutes to 24 hours.

The resulting transition metal and tin constituent-containing peroxotitanic acid solution may, for the sake of pH adjustment, etc., include an alkaline substance or an acidic substance. Illustrative examples of what is referred to here as the alkaline substance include ammonia, sodium hydroxide, calcium hydroxide and alkylamine. Illustrative examples of the acidic substance include inorganic acids such as sulfuric acid, nitric acid, hydrochloric acid, carbonic acid, phosphoric acid and hydrogen peroxide; and organic acids such as formic acid, citric acid, oxalic acid, lactic acid and glycolic acid. The pH of the transition metal and tin-containing peroxotitanic acid solution obtained at this time is from 1 to 9, with a pH of from 4 to 7 being preferred from the standpoint of safety during handling.

Step (2):

In Step (2), the transition metal and tin constituent-containing peroxotitanic acid solution obtained in Step (1) is furnished to a hydrothermal reaction under pressure control and a temperature of between 80° C. and 250° C., preferably between 100° C. and 250° C., for 0.01 to 24 hours. From the standpoint of reaction efficiency and reaction controllability, a reaction temperature of between 80° C. and 250° C. is suitable. As a result, the transition metal and tin constituent-containing peroxotitanic acid is converted to transition metal and tin constituent-containing titanium oxide fine particles. Here, "under pressure control" means to carry out suitable pressurization in such a way as to be able to maintain the reaction temperature in cases where the reaction temperature exceeds the boiling point of the dispersion medium. This includes control at atmospheric pressure in cases where the temperature is at or below the boiling point of the dispersion medium. The pressure used here is generally from about 0.12 MPa to about 4.5 MPa, preferably from about 0.15 MPa to about 4.5 MPa, and more preferably from about 0.20 MPa to about 4.5 MPa. The reaction time is preferably from 1 minute to 24 hours. Step (2) thus provides a dispersion of the transition metal and tin constituent-containing titanium oxide fine particle that serve as the first type of titanium oxide fine particle.

The particle size of the titanium oxide fine particle thus obtained is preferably in the range already mentioned above, although control of the particle size by adjusting the reaction condition is possible. For example, the particle size can be made smaller by shortening the reaction time and the temperature rise time.

Step (3):

In Step (3), separate from above Steps (1) to (2), an iron-group element and chromium-group element constituent-containing peroxotitanic acid solution is prepared by reacting a starting titanium compound, an iron-group element compound, a chromium-group element compound, a basic substance and hydrogen peroxide in an aqueous dispersion medium. Aside from using an iron-group element compound and a chromium-group element compound in place of the transition metal compound and the tin compound in Step (1), the reaction is carried out in exactly the same way.

That is, as the starting materials, these being a starting titanium compound (the same as the starting titanium compound for the first type of titanium oxide fine particle), an iron group compound, a chromium group compound, an aqueous dispersion medium, a basic substance and hydrogen peroxide, each of which has been described above, are used in such a way as to achieve the above-described formulation, and then furnished to a reaction under the temperature and time conditions mentioned above.

The resulting iron-group element and chromium-group element constituent-containing peroxotitanic acid solution may include also an alkaline substance or an acidic substance in order to, for example, adjust the pH. The alkaline substance and acidic substance, and pH adjustment as well, may be handled in the same way as described above.

Step (4):

In Step (4), the iron-group element and chromium-group element constituent-containing peroxotitanic acid solution obtained in Step (3) is furnished to a hydrothermal reaction under pressure control and a temperature of between 80° C. and 250° C., preferably between 100° C. and 250° C., for 0.01 to 24 hours. From the standpoint of reaction efficiency and reaction controllability, a reaction temperature of between 80° C. and 250° C. is suitable. As a result, the iron-group element and chromium-group element constituent-containing peroxotitanic acid is converted to iron-group element and chromium-group element constituent-containing titanium oxide fine particle. Here, "under pressure control" means to carry out suitable pressurization in such a way as to be able to maintain the reaction temperature in cases where the reaction temperature exceeds the boiling point of the dispersion medium. This includes control at atmospheric pressure in cases where the temperature is at or below the boiling point of the dispersion medium. The pressure used here is generally from about 0.12 MPa to about 4.5 MPa, preferably from about 0.15 MPa to about 4.5 MPa, and more preferably from 0.20 MPa to 4.5 MPa. The reaction time is preferably from 1 minute to 24 hours. This Step (4) provides a dispersion of the iron-group element and chromium-group element constituent-containing titanium oxide fine particle that serve as the second type of titanium oxide fine particle.

The particle size of the titanium oxide fine particle thus obtained is preferably in the range already mentioned above, although control of the particle size by adjusting the reaction conditions is possible. For example, the particle size can be made smaller by shortening the reaction time and the temperature rise time.

Step (5):

In Step (5), the first titanium oxide fine particle dispersion obtained from Steps (1) to (2) and the second titanium oxide fine particle dispersion obtained from Steps (3) to (4) are mixed together. The mixing method is not particularly limited, and may consist of agitation with an agitator or dispersion with an ultrasonic disperser. The temperature at the time of mixture is preferably between 20° C. and 100° C., and the mixing time is preferably from 1 minute to 3 hours. As for the mixing ratio, mixing should be carried out in such a way that the weight ratio between the titanium oxide fine particles in the respective titanium oxide fine particle dispersions becomes the weight ratio already described above.

The weights of the titanium oxide fine particles contained in the respective titanium oxide fine particle dispersions can be calculated from the weights and concentrations of the respective titanium oxide fine particle dispersions. Using the following formula, the concentration of the titanium oxide fine particle dispersion can be calculated from the weight of the nonvolatile matter (titanium oxide fine particle) remaining and the weight of the sampled titanium oxide fine particle dispersion after a portion of the titanium oxide fine particle dispersion is sampled and heated at 105° C. for 3 hours to evaporate the solvent thereof.

Concentration (%) of titanium oxide fine particle dispersion=[weight of nonvolatile matter (g)/ weight of titanium oxide fine particle dispersion (g)]×100

As noted above, from the standpoint of the ease of forming a photocatalytic thin film of the required thickness, the total concentration of the first type of titanium oxide fine particle and the second type of titanium oxide fine particle in the visible light-responsive photocatalytic titanium oxide fine particle dispersion thus produced is preferably from 0.01 to 20 wt %, and more preferably from 0.5 to 10 wt %. With regard to adjustment of the concentration, when the concentration is higher than the desired concentration, the concentration can be lowered by adding aqueous solvent to dilute the dispersion; when the concentration is lower than the desired concentration, the concentration can be increased by evaporating or filtering off some of the aqueous solvent. The concentration can be determined as described above.

In case where the above-described film formability-increasing binder is added, such addition is preferably carried out to a visible light-responsive photocatalytic titanium oxide fine particle dispersion whose concentration has been adjusted as described above, such that the desired concentration is achieved following mixture of the aqueous binder solution to be added.

<Member Having Photocatalytic Thin Film on Surface>

The visible light-responsive photocatalytic titanium oxide fine particle dispersion of the invention can be used to form a photocatalytic film on the surface of various kinds of members. Here, the various kinds of members are not particularly limited and the materials making up the members are exemplified by organic materials and inorganic materials. These members can have a variety of shapes depending on their respective purposes and intended applications.

Illustrative examples of the organic materials include synthetic resin materials such as vinyl chloride resin (PVC), polyethylene (PE), polypropylene (PP), polycarbonate (PC), acrylic resin, polyacetal, fluoroplastic, silicone resin, ethylene-vinyl acetate copolymers (EVA), acrylonitrile-butadiene rubber (NBR), polyethylene terephthalate (PET), polyethylene naphthalate (PEN), polyvinyl butyral (PVB), ethylene-vinyl alcohol copolymer (EVOH), polyimide resin, polyphenylene sulfide (PPS), polyetherimide (PEI), polyetheretherimide (PEED, polyetheretherketone (PEEK), melamine resin, phenolic resin and acrylonitrile-butadiene-styrene (ABS) resin; natural materials such as natural rubber; and semi-synthetic materials made of the above synthetic resin materials and natural materials. These materials may be rendered into products of a required shape and construction, such as films, sheets, textile materials, textile products and other moldings or laminates.

Examples of the inorganic materials include nonmetallic inorganic materials and metallic inorganic materials. Examples of nonmetallic inorganic materials include glass, ceramic and stone. These may be rendered into products of various forms, such as tile, glass, mirrors, walls and decorative materials. Examples of metallic inorganic materials include cast iron, steel, iron, ferrous alloys, aluminum, aluminum alloys, nickel, nickel alloys and diecast zinc. These may be plated with the above metallic inorganic materials or coated with the above organic materials, or may be platings applied to the surface of the above organic materials or nonmetallic inorganic materials.

Of the various above members, the visible light-responsive photocatalytic titanium oxide fine particle dispersion of the invention is especially useful for producing transparent photocatalytic thin films on PET and other polymer films.

The method of forming a photocatalytic thin film on the surface of various kinds of members may be one in which the visible light-responsive photocatalytic titanium oxide fine particle dispersion is coated onto the surface of the member by a known coating method such as spray coating or dip coating, and then dried by a known drying method such as far-infrared drying, drying by induction heating or hot-air drying. The thickness of the photocatalytic thin film may be variously selected, although a thickness in the range of from 10 nm to 10 µm is generally preferred.

A film of the above-described visible light-responsive photocatalytic titanium oxide fine particle mixture is thereby formed. In this case, when a binder is included in the above-indicated amount within the above dispersion, a film is formed that contains both a titanium oxide fine-particle mixture and a binder.

The photocatalytic thin film formed in this way is transparent and not only provides, as in the prior art, good photocatalysis when exposed to light in the ultraviolet region (10 to 400 nm), but can also achieve excellent photocatalysis even when exposed only to visible-spectrum light (400 to 800 nm) from which conventional photocatalysts have been unable to obtain sufficient photocatalysis. Owing to photocatalysis by the titanium oxide, the various kinds of members on which this photocatalytic thin film has been formed decompose organic matter adsorbed to the surface, and can therefore exhibit such effects as cleaning, deodorizing and disinfection of the member surface.

EXAMPLES

The invention is illustrated more fully below by way of Working Examples and Comparative Examples, although these Examples are not intended to limit the invention. The various measurements in the invention were carried out as described below.

(1) Average Particle Size ($D_{50}$) of Titanium Oxide Fine Particles in Dispersion The average particle size ($D_{50}$) of titanium oxide fine particles in a dispersion was measured by using the particle size analyzer (trade name: "Nanotrac UPA-EX150"; from Nikkiso Co., Ltd.).

(2) Test of Photocatalytic Thin-Film Performance in Decomposition of Acetaldehyde Gas (Under LED Irradiation)

The activity of a photocatalytic thin film produced by application and drying of the dispersion was evaluated by means of acetaldehyde gas decomposition reactions. Evaluation was carried out as follows by a batch-type method for evaluating gas decomposition performance.

An evaluation sample obtained by forming a photocatalytic thin film containing about 20 mg (dry weight) of photocatalytic fine particles on the entire surface of an A4-size (210 mm×297 mm) PET film was set within a 5-liter capacity stainless steel cell having a quartz glass window, following which the cell was filled with 5 ppm concentration acetaldehyde gas that was moisture-conditioned to 50% humidity and the sample was exposed to light at an illuminance of 30,000 Lx from an LED lamp (model number: TH-211×200SW, from CCS Inc.; spectral distribution, 400 to 800 nm) positioned at the top of the cell. When acetaldehyde gas decomposes on account of the photocatalyst on the thin film, the concentration of acetaldehyde gas within the cell decreases. By measuring the concentration, it is possible to determine the amount of acetaldehyde gas that has decomposed. The acetaldehyde gas concentration was measured with a photoacoustic multigas monitor (trade name: INNOVA 1412, from LumaSense Technologies Inc.), and the lengths of time required for the concentration of acetaldehyde gas to decrease from the initial concentration of 5 ppm to [1] 1 ppm and to [2] 0.03 ppm were evaluated based on the following criteria. The tests were performed for up to 50 hours.

[1] Time Required for Concentration to Decrease to 1 ppm
  Good (○): Decreased to 1 ppm within 10 hours
  Marginal (Δ): Decreased to 1 ppm within 25 hours
  No Good (x): Decrease to 1 ppm took 25 hours or more, or concentration did not decrease to 1 ppm

[2] Time Required for Concentration to Decrease to 0.03 ppm
  Good (○): Decreased to 0.03 ppm within 20 hours
  Marginal (Δ): Decreased to 0.03 ppm within 50 hours
  No Good (x): Decrease to 0.03 ppm took 50 hours or more, or concentration did not decrease to 0.03 ppm (3) Identification of Crystal Phase of Titanium Oxide Fine Particle The crystal phase of the titanium oxide fine particle was identified by powder x-ray diffraction analysis (using a desktop x-ray powder diffractometer available under the trade name D2 PHASER from Bruker AXS) on the titanium oxide fine particle powder recovered by drying the resulting titanium oxide fine particle dispersion at 105° C. for 3 hours.

Working Example 1

<Preparation of Dispersion of Titanium Oxide Fine Particle Containing Tin and Molybdenum in Solid Solution>

A tin and molybdenum-containing titanium hydroxide precipitate was obtained by adding and dissolving tin(IV) chloride in a 36 wt % aqueous solution of titanium(IV) chloride to a Ti/Sn molar ratio of 20, diluting this ten-fold with pure water, and then gradually adding 10 wt % ammonia water in which molybdenum(VI) oxide had been added and dissolved to a Ti/Mo molar ratio of 20 based on the titanium constituent in the aqueous solution of titanium(IV) chloride, thereby effecting neutralization and hydrolysis. The pH at this time was 8. The resulting precipitate was deionization-treated by repeated addition of pure water and decantation. Next, 35 wt % hydrogen peroxide water was added to the deionization-treated tin and molybdenum-containing titanium hydroxide precipitate to a $H_2O_2/(Ti+Sn+Mo)$ molar ratio of 10, after which the system was stirred at 50° C. for three hours to fully carry out the reaction, thereby giving a clear, orange-colored tin and molybdenum-containing peroxotitanic acid solution (a).

A 500 mL autoclave was charged with 400 mL of the tin and molybdenum-containing peroxotitanic acid solution (a), and this was hydrothermally treated at 150° C. for 90 minutes. Next, the concentration was adjusted by adding pure water, thereby giving a dispersion (solids concentration, 1 wt %) of titanium oxide fine particle (A) containing tin and molybdenum in solid solution. Powder x-ray diffraction analysis was carried out on the titanium oxide fine particle (A), whereupon the only observed peaks were rutile-type titanium oxide peaks, indicating that the tin and molybdenum were in solid solution in the titanium oxide.

<Preparation of Dispersion of Titanium Oxide Fine Particle Containing Iron and Tungsten in Solid Solution>

An iron and tungsten-containing titanium hydroxide precipitate was obtained by adding and dissolving iron(III) chloride in a 36 wt % aqueous solution of titanium(IV) chloride to a Ti/Fe molar ratio of 10, diluting this ten-fold with pure water, and then gradually adding 10 wt % ammonia water in which sodium tungstate(VI) had been added and dissolved to a Ti/W molar ratio of 33 based on the titanium constituent in the aqueous solution of titanium(IV) chloride, thereby effecting neutralization and hydrolysis. The pH at this time was 8. The resulting precipitate was deionization-treated by repeated addition of pure water and decantation. Next, 35 wt % hydrogen peroxide water was added to the deionization-treated iron and tungsten-containing titanium hydroxide precipitate to a $H_2O_2/(Ti+Fe+W)$ molar ratio of 8, after which the system was stirred at 40° C. for two hours to fully carry out the reaction, thereby giving a clear, orange-colored iron and tungsten-containing peroxotitanic acid solution (b).

A 500 mL autoclave was charged with 400 mL of the iron and tungsten-containing peroxotitanic acid solution (b), and this was hydrothermally treated at 130° C. for 90 minutes. Next, the concentration was adjusted by adding pure water, thereby giving a dispersion (solids concentration, 1 wt %) of titanium oxide fine particle (B) containing iron and tungsten in solid solution. Powder x-ray diffraction analysis was carried out on the titanium oxide fine particle (B), whereupon the only observed peaks were anatase-type titanium oxide peaks, indicating that the iron and tungsten were in solid solution in the titanium oxide.

A visible light-responsive photocatalytic titanium oxide fine particle dispersion (E-1) was obtained by mixing together the respective dispersions of titanium oxide fine particle (A) and titanium oxide fine particle (B) to a weight ratio of the titanium oxide fine particle (A) to the titanium oxide fine particle (B), expressed as (A):(B), of 50:50.

A coating liquid for evaluation was produced by adding a silica-based binder (colloidal silica available under the trade name Snotex 20 from Nissan Chemical Industries, Ltd.; average particle size, 10 to 20 nm; an aqueous solution having a $SiO_2$ concentration of 20 wt %) to the photocatalytic titanium oxide fine particle dispersion (E-1) so as to give a $TiO_2/SiO_2$ weight ratio of 1.5.

The coating liquid for evaluation was coated onto an A4-size PET film with a #7 wire bar coater in such a way as to form a photocatalytic thin film (thickness, about 80 nm) containing 20 mg of photocatalytic titanium oxide fine particle and dried for one hour in an oven set to 80° C., thereby giving a sample member for evaluation of the acetaldehyde gas decomposition performance. The acetaldehyde gas decomposition performance of this photocatalytic thin film was measured by using the batch-type gas decomposition performance evaluation method, whereupon, following LED irradiation (wavelength, 400 to 800 nm), the acetaldehyde gas concentration decreased to 1 ppm in 5.1 hours (○) and to 0.03 ppm in 10.8 hours (○).

Working Example 2

<Preparation of Dispersion of Titanium Oxide Fine Particle Containing Tin and Molybdenum in Solid Solution>

Aside from adding tin(IV) chloride to a Ti/Sn molar ratio of 33 and molybdenum(VI) oxide to a Ti/Mo molar ratio of 3.3 and setting the hydrothermal treatment time to 120 minutes, a dispersion of titanium oxide fine particle (C) containing tin and molybdenum in solid solution (solids concentration, 1 wt %) was obtained in the same way as in Working Example 1. Powder x-ray diffraction analysis was carried out on the titanium oxide fine particle (C), whereupon the only observed peaks were rutile-type titanium oxide peaks and anatase-type titanium oxide peaks, indicating that the tin and molybdenum were in solid solution in the titanium oxide.

A visible light-responsive photocatalytic titanium oxide fine particle dispersion (E-2) according to the invention was obtained by mixing together the respective dispersions of titanium oxide fine particle (C) and titanium oxide fine particle (B) to a weight ratio of the titanium oxide fine particle (C) to the titanium oxide fine particle (B), expressed as (C):(B), of 50:50.

A coating liquid for evaluation and a photocatalytic thin film were produced from the photocatalytic titanium oxide fine particle dispersion (E-2) in the same way as in Working Example 1. The acetaldehyde gas decomposition performance was measured, whereupon, following LED irradiation, the acetaldehyde gas concentration decreased to 1 ppm in 7.3 hours (O) and to 0.03 ppm in 15.4 hours (O).

Working Example 3

<Preparation of Dispersion of Titanium Oxide Fine Particle Containing Tin and Tungsten in Solid Solution>

A tin and tungsten-containing titanium hydroxide precipitate was obtained by adding and dissolving tin(IV) chloride in a 36 wt % aqueous solution of titanium(IV) chloride to a Ti/Sn molar ratio of 5, diluting this ten-fold with pure water, and then gradually adding 10 wt % ammonia water in which sodium tungstate(VI) had been added and dissolved to a Ti/W molar ratio of 10 based on the titanium constituent in the aqueous solution of titanium(IV) chloride, thereby effecting neutralization and hydrolysis. The pH at this time was 8. The resulting precipitate was deionization-treated by repeated addition of pure water and decantation. Next, 35 wt % hydrogen peroxide water was added to the deionization-treated tin and tungsten-containing titanium hydroxide precipitate to a $H_2O_2/(Ti+Sn+W)$ molar ratio of 10, after which the system was stirred at 50° C. for three hours to fully carry out the reaction, thereby giving a clear, orange-colored tin and tungsten-containing peroxotitanic acid solution (d).

A 500 mL autoclave was charged with 400 mL of the tin and tungsten-containing peroxotitanic acid solution (d), and this was hydrothermally treated at 180° C. for 90 minutes. Next, the concentration was adjusted by adding pure water, thereby giving a dispersion (solids concentration, 1 wt %) of titanium oxide fine particle (D) containing tin and tungsten in solid solution. Powder x-ray diffraction analysis was carried out on the titanium oxide fine particle (D), whereupon the only observed peaks were rutile-type titanium oxide peaks, indicating that the tin and tungsten were in solid solution in the titanium oxide.

A visible light-responsive photocatalytic titanium oxide fine particle dispersion (E-3) was obtained by mixing together the respective dispersions of titanium oxide fine particle (D) and titanium oxide fine particle (B) to a weight ratio of the titanium oxide fine particle (D) to the titanium oxide fine particle (B), expressed as (D):(B), of 50:50.

A coating liquid for evaluation and a photocatalytic thin film were produced from the photocatalytic titanium oxide fine particle dispersion (E-3) in the same way as in Working Example 1. The acetaldehyde gas decomposition performance was measured, whereupon, following LED irradiation, the acetaldehyde gas concentration decreased to 1 ppm in 6.2 hours (O) and to 0.03 ppm in 13.1 hours (O).

Working Example 4

<Preparation of Dispersion of Titanium Oxide Fine Particle Containing Tin, Molybdenum and Tungsten in Solid Solution>

A tin, molybdenum and tungsten-containing titanium hydroxide precipitate was obtained by adding and dissolving tin(IV) chloride in a 36 wt % aqueous solution of titanium (IV) chloride to a Ti/Sn molar ratio of 20, diluting this ten-fold with pure water, and then gradually adding 10 wt % ammonia water in which molybdenum(VI) oxide had been added and dissolved to a Ti/Mo molar ratio of 50 and sodium tungstate(VI) had been added and dissolved to a Ti/W molar ratio of 20 based on the titanium constituent in the aqueous solution of titanium(IV) chloride, thereby effecting neutralization and hydrolysis. The pH at this time was 8. The resulting precipitate was deionization-treated by repeated addition of pure water and decantation. Next, 35 wt % hydrogen peroxide water was added to the deionization-treated tin, molybdenum and tungsten-containing titanium hydroxide precipitate to a $H_2O_2/(Ti+Sn+Mo+W)$ molar ratio of 10, after which the system was stirred at 80° C. for three hours to fully carry out the reaction, thereby giving a clear, orange-colored tin, molybdenum and tungsten-containing peroxotitanic acid solution (e).

A 500 mL autoclave was charged with 400 mL of the tin, molybdenum and tungsten-containing peroxotitanic acid solution (e), and this was hydrothermally treated at 150° C. for 90 minutes. Next, the concentration was adjusted by adding pure water, thereby giving a dispersion (solids concentration, 1 wt %) of titanium oxide fine particle (E) containing tin, molybdenum and tungsten in solid solution. Powder x-ray diffraction analysis was carried out on the titanium oxide fine particle (E), whereupon the only observed peaks were rutile-type titanium oxide peaks, indicating that the tin, molybdenum and tungsten were in solid solution in the titanium oxide.

A visible light-responsive photocatalytic titanium oxide fine particle dispersion (E-4) was obtained by mixing together the respective dispersions of titanium oxide fine particle (E) and titanium oxide fine particles (B) to a weight ratio of the titanium oxide fine particle (E) to the titanium oxide fine particles (B), expressed as (E):(B), of 70:30.

A coating liquid for evaluation and a photocatalytic thin film were produced from the photocatalytic titanium oxide fine particle dispersion (E-4) in the same way as in Working Example 1. The acetaldehyde gas decomposition performance was measured, whereupon, following LED irradiation, the acetaldehyde gas concentration decreased to 1 ppm in 3.9 hours (O) and to 0.03 ppm in 8.0 hours (O).

Working Example 5

<Preparation of Dispersion of Titanium Oxide Fine Particle Containing Tin and Vanadium in Solid Solution>

A tin and vanadium-containing titanium hydroxide precipitate was obtained by adding and dissolving tin(IV) chloride in a 36 wt % aqueous solution of titanium(IV) chloride to a Ti/Sn molar ratio of 20 and vanadyl(IV) sulfate to a Ti/V molar ratio of 2,000, diluting this ten-fold with pure water, and then gradually adding 10 wt % ammonia water, thereby effecting neutralization and hydrolysis. The pH of the solution at this time was 8.5. The resulting precipitate was deionization-treated by repeated addition of pure water and decantation. Next, 35 wt % hydrogen peroxide water was added to the deionization-treated tin and vanadium-containing titanium hydroxide precipitate to a $H_2O_2/(Ti+Sn+V)$ molar ratio of 10, after which the system was stirred at 50° C. for three hours to fully carry out the reaction, thereby giving a clear, orange-colored tin and vanadium-containing peroxotitanic acid solution (f).

A 500 mL autoclave was charged with 400 mL of the tin and vanadium-containing peroxotitanic acid solution (f), and this was hydrothermally treated at 150° C. for 90 minutes. Next, the concentration was adjusted by adding pure water, thereby giving a dispersion (solids concentration, 1 wt %) of titanium oxide fine particle (F) containing tin and vanadium in solid solution. Powder x-ray diffraction analysis was carried out on the titanium oxide fine particle (F), whereupon the only observed peaks were rutile-type titanium oxide peaks, indicating that the tin and vanadium were in solid solution in the titanium oxide.

A visible light-responsive photocatalytic titanium oxide fine particle dispersion (E-5) was obtained by mixing together the respective dispersions of titanium oxide fine particle (F) and titanium oxide fine particle (B) to a weight ratio of the titanium oxide fine particle (F) to the titanium oxide fine particle (B), expressed as (F):(B), of 90:10.

A coating liquid for evaluation and a photocatalytic thin film were produced from the photocatalytic titanium oxide fine particle dispersion (E-5) in the same way as in Working Example 1. The acetaldehyde gas decomposition performance was measured, whereupon, following LED irradiation, the acetaldehyde gas concentration decreased to 1 ppm in 9.5 hours (O) and to 0.03 ppm in 19.2 hours (O).

Working Example 6

<Preparation of Dispersion of Titanium Oxide Fine Particle Containing Iron and Molybdenum in Solid Solution>

An iron and molybdenum-containing titanium hydroxide precipitate was obtained by adding and dissolving iron(III) chloride in a 36 wt % aqueous solution of titanium(IV) chloride to a Ti/Fe molar ratio of 10, diluting this ten-fold with pure water, and then gradually adding 10 wt % ammonia water in which molybdenum(VI) oxide was added and dissolved to a Ti/Mo molar ratio of 5 based on the titanium constituent in the aqueous solution of titanium(IV) chloride, thereby effecting neutralization and hydrolysis. The pH at this time was 8. The resulting precipitate was deionization-treated by repeated addition of pure water and decantation. Next, 35 wt % hydrogen peroxide water was added to the deionization-treated iron and molybdenum-containing titanium hydroxide precipitate to a $H_2O_2/(Ti+Fe+Mo)$ molar ratio of 8, after which the system was stirred at 50° C. for two hours to fully carry out the reaction, thereby giving a clear, orange-colored iron and molybdenum-containing peroxotitanic acid solution (g).

A 500 mL autoclave was charged with 400 mL of the iron and molybdenum-containing peroxotitanic acid solution (g), and this was hydrothermally treated at 130° C. for 120 minutes. Next, the concentration was adjusted by adding pure water, thereby giving a dispersion (solids concentration, 1 wt %) of titanium oxide fine particle (G) containing iron and molybdenum in solid solution. Powder x-ray diffraction analysis was carried out on the titanium oxide fine particle (G), whereupon the only observed peaks were anatase-type titanium oxide peaks, indicating that the iron and molybdenum were in solid solution in the titanium oxide.

A visible light-responsive photocatalytic titanium oxide fine particle dispersion (E-6) was obtained by mixing together the respective dispersions of titanium oxide fine particle (A) and titanium oxide fine particle (G) to a weight ratio of the titanium oxide fine particle (A) to the titanium oxide fine particle (G), expressed as (A):(G), of 50:50.

A coating liquid for evaluation and a photocatalytic thin film were produced from the photocatalytic titanium oxide fine particle dispersion (E-6) in the same way as in Working Example 1. The acetaldehyde gas decomposition performance was measured, whereupon, following LED irradiation, the acetaldehyde gas concentration decreased to 1 ppm in 6.5 hours (O) and to 0.03 ppm in 14.6 hours (O).

Working Example 7

<Preparation of Dispersion of Titanium Oxide Fine Particle Containing Iron and Tungsten in Solid Solution>

Aside from adding iron(III) chloride to a Ti—Fe molar ratio of 6.6, adding sodium tungstate(VI) to a Ti/W molar ratio of 10 and setting the hydrothermal treatment temperature to 120° C. and the hydrothermal treatment time to 180 minutes, a dispersion (solids concentration, 1 wt %) of titanium oxide fine particle (H) containing iron and tungsten in solid solution was obtained in the same way as in Working Example 1. Powder x-ray diffraction analysis was carried out on the titanium oxide fine particle (H), whereupon the only observed peaks were anatase-type titanium oxide peaks, indicating that the iron and tungsten were in solid solution in the titanium oxide.

A visible light-responsive photocatalytic titanium oxide fine particle dispersion (E-7) was obtained by mixing together the respective dispersions of titanium oxide fine particle (E) and titanium oxide fine particle (H) to a weight ratio of the titanium oxide fine particle (E) to the titanium oxide fine particle (H), expressed as (E):(H), of 70:30.

A coating liquid for evaluation and a photocatalytic thin film were produced from the photocatalytic titanium oxide fine particle dispersion (E-7) in the same way as in Working Example 1. The acetaldehyde gas decomposition performance was measured, whereupon, following LED irradiation, the acetaldehyde gas concentration decreased to 1 ppm in 3.2 hours (O) and to 0.03 ppm in 6.8 hours (O).

Working Example 8

A visible light-responsive photocatalytic titanium oxide fine particle dispersion (E-8) according to the invention was obtained by mixing together respective dispersions of titanium oxide fine particle (A), titanium oxide fine particle (D) and titanium oxide fine particle (H) to the weight ratio (A):(D):(H)=35:35:30.

A coating liquid for evaluation and a photocatalytic thin film were produced from the photocatalytic titanium oxide fine particle dispersion (E-8) in the same way as in Working Example 1. The acetaldehyde gas decomposition performance was measured, whereupon, following LED irradiation, the acetaldehyde gas concentration decreased to 1 ppm in 4.4 hours (O) and to 0.03 ppm in 8.5 hours (O).

Working Example 9

A visible light-responsive photocatalytic titanium oxide fine-particle dispersion (E-9) according to the invention was obtained by mixing respective dispersions of titanium oxide fine particle (A), titanium oxide fine particle (B) and titanium oxide fine particle (G) to the weight ratio (A):(B):(G)= 40:30:30.

A coating liquid for evaluation and a photocatalytic thin film were produced from the photocatalytic titanium oxide fine particle dispersion (E-9) in the same way as in Working Example 1. The acetaldehyde gas decomposition performance was measured, whereupon, following LED irradiation, the acetaldehyde gas concentration decreased to 1 ppm in 9.3 hours (O) and to 0.03 ppm in 19.3 hours (O).

Comparative Example 1

A titanium oxide fine particle dispersion (C-1) was obtained using only a dispersion of titanium oxide fine particles (A).

A coating liquid for evaluation and a photocatalytic thin film were produced from the titanium oxide fine particle dispersion (C-1) in the same way as in Working Example 1. The acetaldehyde gas decomposition performance was measured, whereupon, following LED irradiation, the acetaldehyde gas concentration decreased only to 4.5 ppm even when 50 hours had elapsed (x).

Comparative Example 2

A titanium oxide fine-particle dispersion (C-2) was obtained using only a dispersion of titanium oxide fine particles (B).

A coating liquid for evaluation and a photocatalytic thin film were produced from the titanium oxide fine particle dispersion (C-2) in the same way as in Working Example 1. The acetaldehyde gas decomposition performance was measured, whereupon, following LED irradiation, a decrease in the acetaldehyde gas concentration was not observed even when 50 hours had elapsed (x).

Comparative Example 3

<Preparation of Dispersion of Titanium Oxide Fine Particle Containing Iron in Solid Solution>

An iron-containing titanium hydroxide precipitate was obtained by adding and dissolving iron(III) chloride in a 36 wt % aqueous solution of titanium(IV) chloride to a Ti/Fe molar ratio of 10, diluting this ten-fold with pure water, and then gradually adding 10 wt % ammonia water to the resulting aqueous solution, thereby effecting neutralization and hydrolysis. The pH at this time was 8. The resulting precipitate was deionization-treated by repeated addition of pure water and decantation. Next, 35 wt % hydrogen peroxide water was added to the deionization-treated iron-containing titanium hydroxide precipitate to a $H_2O_2/(Ti+Fe)$ molar ratio of 8, after which the system was stirred at 40° C. for two hours to fully carry out the reaction, thereby giving a clear, orange-colored iron-containing peroxotitanic acid solution (i).

A 500 mL autoclave was charged with 400 mL of the iron-containing peroxotitanic acid solution (i), and this was hydrothermally treated at 130° C. for 90 minutes. Next, the concentration was adjusted by adding pure water, thereby giving a dispersion (solids concentration, 1 wt %) of titanium oxide fine particle (I) containing iron in solid solution. Powder x-ray diffraction analysis was carried out on the titanium oxide fine particle (I), whereupon the only observed peaks were anatase-type titanium oxide peaks, indicating that the iron was in solid solution in the titanium oxide.

A titanium oxide fine particle dispersion (C-3) was obtained using only the dispersion of titanium oxide fine particle (I).

A coating liquid for evaluation and a photocatalytic thin film were produced from the titanium oxide fine particle dispersion (C-3) in the same way as in Working Example 1. The acetaldehyde gas decomposition performance was measured, whereupon, following LED irradiation, a decrease in the acetaldehyde gas concentration was not observed even when 50 hours had elapsed (x).

Comparative Example 4

<Preparation of Dispersion of Titanium Oxide Fine Particle Containing Copper in Solid Solution>

A copper-containing titanium hydroxide precipitate was obtained by adding and dissolving copper(II) chloride in a 36 wt % aqueous solution of titanium(IV) chloride to a Ti/Cu molar ratio of 20, diluting this ten-fold with pure water, and then gradually adding 10 wt % ammonia water, thereby effecting neutralization and hydrolysis. The pH at this time was 7.5. The resulting precipitate was deionization-treated by repeated addition of pure water and decantation. Next, 35 wt % hydrogen peroxide water was added to the deionization-treated copper-containing titanium hydroxide precipitate to a $H_2O_2/(Ti+Cu)$ molar ratio of 12, after which the system was stirred at 40° C. for three hours to fully carry out the reaction, thereby giving a clear, green-colored copper-containing peroxotitanic acid solution (j).

A 500 mL autoclave was charged with 400 mL of the copper-containing peroxotitanic acid solution (j), and this was hydrothermally treated at 130° C. for 90 minutes. Next, the concentration was adjusted by adding pure water, thereby giving a dispersion (solids concentration, 1 wt %) of titanium oxide fine particle (J) containing copper in solid solution. Powder x-ray diffraction analysis was carried out on the titanium oxide fine particle (J), whereupon the only observed peaks were anatase-type titanium oxide peaks, indicating that the copper was in solid solution in the titanium oxide.

A titanium oxide fine particle dispersion (C-4) was obtained using only the dispersion of titanium oxide fine particle (J).

A coating liquid for evaluation and a photocatalytic thin film were produced from the titanium oxide fine particle dispersion (C-4) in the same way as in Working Example 1. The acetaldehyde gas decomposition performance was measured, whereupon, following LED irradiation, the acetaldehyde gas concentration decreased only to 4.6 ppm in 50 hours (x).

Comparative Example 5

A titanium oxide fine-particle dispersion (C-5) was obtained by mixing together a dispersion of titanium oxide fine particle (A) and a dispersion of titanium oxide fine particle (I) to the weight ratio (A):(I)=50:50.

A coating liquid for evaluation and a photocatalytic thin film were produced from the titanium oxide fine particle dispersion (C-5) in the same way as in Working Example 1. The acetaldehyde gas decomposition performance was measured, whereupon, following LED irradiation, the acetaldehyde gas concentration decreased to 1 ppm in 12.5 hours (Δ) and to 0.03 ppm in 30.5 hours (Δ).

Comparative Example 6

A titanium oxide fine particle dispersion (C-6) was obtained by mixing together respective dispersions of titanium oxide fine particle (A) and titanium oxide fine particle (J) to the weight ratio (A):(J)=70:30.

A coating liquid for evaluation and a photocatalytic thin film were produced from the titanium oxide fine particle dispersion (C-6) in the same way as in Working Example 1.

The acetaldehyde gas decomposition performance was measured, whereupon, following LED irradiation, the acetaldehyde gas concentration decreased to 1 ppm in 17.1 hours (○) and to 0.2 ppm in 50 hours (x).

Comparative Example 7

A titanium oxide fine particle dispersion (C-7) was obtained by mixing together respective dispersions of titanium oxide fine particle (D) and titanium oxide fine particle (I) to the weight ratio (D):(I)=50:50.

A coating liquid for evaluation and a photocatalytic thin film were produced from the titanium oxide fine particle dispersion (C-7) in the same way as in Working Example 1. The acetaldehyde gas decomposition performance was measured, whereupon, following LED irradiation, the acetaldehyde gas concentration decreased to 1 ppm in 15.0 hours (Δ) and to 0.03 ppm in 48.2 hours (Δ).

Comparative Example 8

<Preparation of Dispersion of Titanium Oxide Fine Particle Containing Tin in Solid Solution>

A tin-containing titanium hydroxide precipitate was obtained by adding and dissolving tin(IV) chloride in a 36 wt % aqueous solution of titanium(IV) chloride to a Ti/Sn molar ratio of 20, diluting this ten-fold with pure water, and then gradually adding 10 wt % ammonia water, thereby effecting neutralization and hydrolysis. The pH at this time was 9. The resulting precipitate was deionization-treated by repeated addition of pure water and decantation. Next, 35 wt % hydrogen peroxide water was added to the deionization-treated tin-containing titanium hydroxide precipitate to a $H_2O_2/(Ti+Sn)$ molar ratio of 6, after which the system was stirred at room temperature for one full day and night to fully carry out the reaction, thereby giving a clear, orange-colored tin-containing peroxotitanic acid solution (k).

A 500 mL autoclave was charged with 400 mL of the tin-containing peroxotitanic acid solution (k), and this was hydrothermally treated at 150° C. for 90 minutes. Next, the concentration was adjusted by adding pure water, thereby giving a dispersion (solids concentration, 1 wt %) of titanium oxide fine particle (K) containing tin in solid solution. Powder x-ray diffraction analysis was carried out on the titanium oxide fine particle (K), whereupon the only observed peaks were rutile-type titanium oxide peaks, indicating that the tin was in solid solution in the titanium oxide.

A titanium oxide fine-particle dispersion (C-8) was obtained by mixing together respective dispersions of titanium oxide fine particle (K) and titanium oxide fine particle (B) to the weight ratio (K):(B)=70:30.

A coating liquid for evaluation and a photocatalytic thin film were produced from the titanium oxide fine particle dispersion (C-8) in the same way as in Working Example 1. The acetaldehyde gas decomposition performance was measured, whereupon, following LED irradiation, the acetaldehyde gas concentration decreased to 1 ppm in 39.6 hours (x) and to 0.9 ppm in 50 hours (x).

Comparative Example 9

<Preparation of Dispersion of Titanium Oxide Fine Particle Containing Molybdenum in Solid Solution>

A molybdenum-containing titanium hydroxide precipitate was obtained by diluting a 36 wt % aqueous solution of titanium(IV) chloride ten-fold with pure water, adding to this aqueous solution and dissolving molybdenum(VI) oxide to a Ti/Mo molar ratio of 20 with respect to the titanium constituent in the aqueous solution of titanium(IV) chloride, and then gradually adding 10 wt % ammonia water, thereby effecting neutralization and hydrolysis. The pH at this time was 8. The resulting precipitate was deionization-treated by repeated addition of pure water and decantation. Next, 35 wt % hydrogen peroxide water was added to the deionization-treated molybdenum-containing titanium hydroxide precipitate to a $H_2O_2/(Ti+Mo)$ molar ratio of 8, after which the system was stirred at room temperature for one full day and night to fully carry out the reaction, thereby giving a clear, orange-colored molybdenum-containing peroxotitanic acid solution (l).

A 500 mL autoclave was charged with 400 mL of the molybdenum-containing peroxotitanic acid solution (l), and this was hydrothermally treated at 130° C. for 120 minutes. Next, the concentration was adjusted by adding pure water, thereby giving a dispersion (solids concentration, 1 wt %) of titanium oxide fine particle (L) containing molybdenum in solid solution. Powder x-ray diffraction analysis was carried out on the titanium oxide fine particle (L), whereupon the only observed peaks were anatase-type titanium oxide peaks, indicating that the molybdenum was in solid solution in the titanium oxide.

A titanium oxide fine-particle dispersion (C-9) was obtained by mixing together respective dispersions of titanium oxide fine particle (L) and titanium oxide fine particle (B) to the weight ratio (L):(B)=50:50.

A coating liquid for evaluation and a photocatalytic thin film were produced from the titanium oxide fine particle dispersion (C-9) in the same way as in Working Example 1. The acetaldehyde gas decomposition performance was measured, whereupon, following LED irradiation, the acetaldehyde gas concentration decreased only to 4.7 ppm even when 50 hours had elapsed (x).

Comparative Example 10

<Preparation of Titanium Oxide Fine-Particle Dispersion>

A titanium hydroxide precipitate was obtained by diluting a 36 wt % aqueous solution of titanium(IV) chloride ten-fold with pure water and then gradually adding 10 wt % ammonia water, thereby effecting neutralization and hydrolysis. The pH at this time was 9. The resulting precipitate was deionization treated by repeated addition of pure water and decantation. Next, 35 wt % hydrogen peroxide water was added to the deionization-treated titanium hydroxide precipitate to a $H_2O_2/Ti$ molar ratio of 5, after which the system was stirred at room temperature for one full day and night to fully carry out the reaction, thereby giving a clear, yellow-colored peroxotitanic acid solution (m).

A 500 mL autoclave was charged with 400 mL of the peroxotitanic acid solution (m), and this was hydrothermally treated at 130° C. for 90 minutes. Next, the concentration was adjusted by adding pure water, thereby giving a dispersion (solids concentration, 1 wt %) of titanium oxide fine particle (M). Powder x-ray diffraction analysis was carried out on the titanium oxide fine particle (M), whereupon the observed peaks were anatase-type titanium oxide peaks.

A titanium oxide fine-particle dispersion (C-10) was obtained by using only the dispersion of titanium oxide fine particle (M).

A coating liquid for evaluation and a photocatalytic thin film were produced from the titanium oxide fine particle dispersion (C-10) in the same way as in Working Example 1. The acetaldehyde gas decomposition performance was measured, whereupon, following LED irradiation, the acetaldehyde gas concentration did not decrease even when 50 hours had elapsed (x).

Comparative Example 11

<Recovery of Dissolved Constituent from Dispersion of Titanium Oxide Fine Particle Containing Iron in Solid Solution>

The dispersion of titanium oxide fine particle (I) containing iron in solid solution was centrifugally separated at 210,000×g with a small ultracentrifuge (available under the trade name Himac CS150NX from Hitachi Koki Co., Ltd.) into titanium oxide fine particle (I) containing iron in solid solution, solvent and dissolved constituent. The concentration of dissolved iron constituent in the solvent, as measured with an inductively coupled plasma (ICP) emission spectrometer (available under the trade name ICP Emission Spectrometer IRIS 1000 from Thermo Fisher Scientific), was 2.2 ppm, indicating that substantially all of the iron constituent added had entered into solid solution in the titanium oxide fine particle and become insoluble constituent.

A titanium oxide fine particle dispersion (C-11) was obtained by mixing together the dispersion of titanium oxide fine particle (A) with the solvent and dissolved constituent obtained by separating off the titanium oxide fine particle (I) from the dispersion of titanium oxide fine particle (I) with an ultracentrifuge, to a weight ratio between the titanium oxide fine particle (A) and the solvent and dissolved constituent, expressed as (A):(I dissolved constituent), of 50:50.

A coating liquid for evaluation and a photocatalytic thin film were produced from the titanium oxide fine particle dispersion (C-11) in the same way as in Working Example 1. The acetaldehyde gas decomposition performance was measured, whereupon, following LED irradiation, the acetaldehyde gas concentration decreased only to 4.8 ppm even when 50 hours had elapsed (x).

Comparative Example 12

<Preparation of Dispersion of Titanium Oxide Fine Particle Having Iron Constituent Adsorbed to (Supported on) Surface>

A dispersion (C-12) of titanium oxide fine particle having an iron constituent adsorbed to the surface was obtained by mixing together a dispersion of titanium oxide fine particle (A) and an aqueous solution of iron(III) chloride dissolved in pure water to a concentration of 1 wt %, to a weight ratio between the titanium oxide fine particle (A) and the iron of 100:0.05.

A coating liquid for evaluation and a photocatalytic thin film were produced from the titanium oxide fine particle dispersion (C-12) in the same way as in Working Example 1. The acetaldehyde gas decomposition performance was measured, whereupon, following LED irradiation, the acetaldehyde gas concentration decreased to 1 ppm in 23.0 hours (Δ), and the acetaldehyde gas concentration decreased to 0.8 ppm in 50 hours (x).

Comparative Example 13

<Preparation of Dispersion of Titanium Oxide Fine Particle Having Iron Constituent Adsorbed to (Supported on) Surface>

A dispersion of titanium oxide fine particle (A) and an aqueous solution of iron(III) chloride obtained by dissolving iron(III) chloride in pure water to a concentration of 1 wt % were mixed together to a weight ratio of the titanium oxide fine particle (A) to the iron of 100:0.5, whereupon titanium oxide fine particle in the dispersion (C-13) agglomerated and precipitated out, and so the evaluation was stopped. A method in which an iron group compound is added in this way to a dispersion worsens the dispersed state of the titanium oxide fine particle within the dispersion, greatly limiting the amount that can be added. In addition, the stability of the liquid also worsens.

Table 1 collectively presents the starting material ratios, hydrothermal treatment conditions and average particle sizes ($D_{50}$) for the titanium oxide fine particles used in Working Examples 1 to 9 and Comparative Examples 1 to 13.

TABLE 1

| Titanium oxide fine particle dispersion | Molar ratios of starting materials | | | | | | Hydrothermal treatment | | Average particle size nm |
|---|---|---|---|---|---|---|---|---|---|
| | Ti/Sn | Ti/Mo | Ti/W | Ti/V | Ti/Fe | Ti/Cu | Temp. (° C.) | Time (min) | |
| (A) | 20 | 20 | | | | | 150 | 90 | 12 |
| (B) | | | 33 | | 10 | | 130 | 90 | 13 |
| (C) | 33 | 3.3 | | | | | 150 | 120 | 12 |
| (D) | 5 | | 10 | | | | 180 | 90 | 7 |
| (E) | 20 | 50 | 20 | | | | 150 | 90 | 9 |
| (F) | 20 | | | 2,000 | | | 150 | 90 | 9 |
| (G) | | 5 | | | 10 | | 130 | 120 | 18 |
| (H) | | | 10 | | 6.6 | | 120 | 180 | 12 |
| (I) | | | | | 10 | | 130 | 90 | 18 |
| (J) | | | | | | 20 | 130 | 90 | 18 |
| (K) | 20 | | | | | | 150 | 90 | 10 |
| (L) | | 20 | | | | | 130 | 120 | 16 |
| (M) | | | | | | | 130 | 90 | 20 |

Table 2 collectively presents the mixing ratios, average particles sizes and acetaldehyde gas decomposition test results for the visible light-responsive photocatalytic fine particle dispersions obtained in Working Examples 1 to 9 and Comparative Examples 1 to 13.

TABLE 2

| | | | Titanium oxide dispersion | | Evaluation results | | | | |
|---|---|---|---|---|---|---|---|---|---|
| | | Evaluation sample | Type | | Mixing ratio | Average particle size nm | 80% reduction 1 ppm (hr) | Rating | 99.4% reduction 0.03 ppm (hr) | Rating |
| Working Example | 1 | E-1 | (A) | (B) | 50:50 | 13 | 5.1 | ○ | 10.8 | ○ |
| | 2 | E-2 | (C) | (B) | 50:50 | 12 | 7.3 | ○ | 15.4 | ○ |
| | 3 | E-3 | (D) | (B) | 50:50 | 10 | 6.2 | ○ | 13.1 | ○ |
| | 4 | E-4 | (E) | (B) | 70:30 | 11 | 3.9 | ○ | 8.0 | ○ |
| | 5 | E-5 | (F) | (B) | 90:10 | 10 | 9.5 | ○ | 19.2 | ○ |
| | 6 | E-6 | (A) | (G) | 50:50 | 15 | 6.5 | ○ | 14.6 | ○ |
| | 7 | E-7 | (E) | (H) | 70:30 | 11 | 3.2 | ○ | 6.8 | ○ |
| | 8 | E-8 | (A), (D) | (H) | 35:35:30 | 10 | 4.4 | ○ | 8.5 | ○ |
| | 9 | E-9 | (A) | (B), (G) | 40:30:30 | 14 | 9.3 | ○ | 19.3 | ○ |
| Comparative Example | 1 | C-1 | (A) | | 100:0 | 12 | 50 hrs, 4.5 ppm | x | 50 hrs, 4.5 ppm | x |
| | 2 | C-2 | | (B) | 0:100 | 13 | no decrease | x | no decrease | x |
| | 3 | C-3 | | (I) | 0:100 | 18 | no decrease | x | no decrease | x |
| | 4 | C-4 | | (J) | 0:100 | 18 | 50 hr, 4.6 ppm | x | 50 hr, 4.6 ppm | x |
| | 5 | C-5 | (A) | (I) | 50:50 | 15 | 12.5 | Δ | 30.5 | Δ |
| | 6 | C-6 | (A) | (J) | 70:30 | 16 | 17.1 | Δ | 50 hr, 0.2 ppm | x |
| | 7 | C-7 | (D) | (I) | 50:50 | 14 | 15.0 | Δ | 48.2 | Δ |
| | 8 | C-8 | (K) | (B) | 70:30 | 11 | 39.6 | x | 50 hr, 0.9 ppm | x |
| | 9 | C-9 | (L) | (B) | 50:50 | 15 | 50 hr, 4.7 ppm | x | 50 hr, 4.7 ppm | x |
| | 10 | C-10 | | (M) | 0:100 | 20 | no decrease | x | no decrease | x |
| | 11 | C-11 | (A) | (I) dissolved constituents | 50:50 | 12 | 50 hr, 4.8 ppm | x | 50 hr, 4.8 ppm | x |
| | 12 | C-12 | (A) | iron chloride solution (aq) | 0.05 to 100 TiO$_2$ | 23 | 23.0 | Δ | 50 hr, 0.8 ppm | x |
| | 13 | C-13 | (A) | iron chloride solution (aq) | 0.5 to 100 TiO$_2$ | — | Evaluation was stopped because dipersion incurred agglomeration and precipitation | | | |

As is apparent from the results in Working Examples 1 to 9, by mixing together a first type of titanium oxide fine particle containing in solid solution a tin constituent and a transition metal constituent that increases visible light responsiveness (molybdenum constituent, tungsten constituent, vanadium constituent) and a second type of titanium oxide fine particle containing in solid solution an iron group constituent and a chromium group constituent, even with a small amount of photocatalyst, the acetaldehyde gas decomposition is good even under irradiation with an LED lamp that emits only light in the visible region. Moreover, the acetaldehyde gas concentration can be lowered within an effective time period such as 50 hours or less, and preferably 20 hours or less, to the level of 0.03 ppm or below which is the indoor concentration guideline value for a chemical substance (acetaldehyde) within indoor air established by the Japanese Ministry of Health, Labor and Welfare.

As is apparent from the results in Comparative Examples 1 and 2, a sufficient photocatalytic activity under visible light irradiation cannot be obtained with the first type of titanium oxide fine particle alone or the second type of titanium oxide fine particle alone.

As is apparent from the results in Comparative Examples, 2, 3, 4 and 10, in cases where, respectively, titanium oxide fine particle containing iron in solid solution, titanium oxide fine particle containing iron and a chromium group constituent (tungsten) in solid solution, titanium oxide fine particle containing copper in solid solution and titanium oxide fine particle that do not contain any dissimilar metals in solid solution are used alone, no activity whatsoever is obtained under visible light irradiation. This behavior differs from when titanium oxide particle containing copper in solid solution is used alone.

As is apparent from the results in Comparative Examples 5 and 7, when iron alone is selected as the metal contained in solid solution in the second type of titanium oxide fine particle, the time required for acetaldehyde gas decomposition is longer and the photocatalytic activity is lower than when both iron and a chromium group constituent are selected as the metals contained in solid solution within the second type of titanium oxide fine particle shown in the respective Working Examples.

As is apparent from the results in Comparative Example 6, when copper is selected as the metal contained in solid solution in the second type of titanium oxide fine particle, under visible light irradiation, decomposition occurs initially when the acetaldehyde concentration is high, but a sufficient photocatalytic activity on low-concentration acetaldehyde gas is not obtained. By contrast, as shown in each of the Working Examples, when an iron group constituent and a chromium group constituent are selected as the metals contained in solid solution in the second type of titanium oxide fine particle, it is obtained not only a rapid decomposition rate when the acetaldehyde gas concentration is high, but also a photocatalytic activity even when the acetaldehyde gas concentration is low, making it possible to lower the concentration to 0.03 ppm or below.

As is apparent from the results in Comparative Examples 8 and 9, when the metal contained in solid solution in the first type of titanium oxide fine particle is tin alone or a transition metal alone, a sufficient photocatalytic activity cannot be obtained under visible light irradiation. Therefore, in order to obtain a high activity under visible light irradiation, it is necessary to add tin and a transition metal constituent that increases the visible light responsiveness to the first type of titanium oxide fine particle.

As is apparent from the results in Comparative Example 11, the second type of titanium oxide fine particle is essential for increasing the visible light activity, and an iron constituent which is dissolved in the dispersion rather than being contained in solid solution in the second type of titanium oxide fine particle does not contribute to increased activity. That is, the chief factor in the visible light activity-increasing effect is not an iron constituent that leaks from the second type of titanium oxide fine particle; rather, it depends on the combination of the second type of titanium oxide fine particle containing in solid solution an iron group constituent and a chromium group constituent with the first type of titanium oxide fine particle containing in solid solution tin and a transition metal constituent which increases the visible light responsiveness.

Moreover, as is apparent form the results of Comparative Examples 12 and 13, although a dissolved iron constituent does contribute somewhat to increased visible light activity, a sufficient visible light activity on low-concentration acetaldehyde gas is not obtained. Also, when a dissolved iron constituent is added in a large amount, this may cause the titanium oxide fine particles within the dispersion to agglomerate and precipitate out.

INDUSTRIAL APPLICABILITY

The visible light-responsive photocatalytic fine particle dispersions of the invention are useful for the production of photocatalytic thin films by coating onto various types of substrates made of inorganic materials such as glass or metal or made of organic materials such as polymer films (e.g., PET films), and are particularly useful for producing transparent photocatalytic thin films on polymer films.

The invention claimed is:

1. A visible light-responsive photocatalytic titanium oxide fine particle mixture comprising:
   a first type of titanium oxide fine particle containing in solid solution a tin constituent and a transition metal constituent (exclusive of an iron-group element constituent) that increases visible light responsiveness; and
   a second type of titanium oxide fine particle containing in solid solution an iron-group element constituent and a chromium-group element constituent, wherein the chromium-group element constituent contained in solid solution in the second type of titanium oxide fine particle is at least one member selected from the group consisting of a chromium constituent, a molybdenum constituent, and a tungsten constituent.

2. The visible light-responsive photocatalytic titanium oxide fine particle mixture of claim 1, wherein a weight ratio between the first type of titanium oxide fine particle and the second type of titanium oxide fine particle is from 99 to 0.01, and the weight ratio is expressed as (weight of the first type of titanium oxide fine particle)/(weight of the second type of titanium oxide fine particle).

3. The visible light-responsive photocatalytic titanium oxide fine particle mixture of claim 1 or 2, wherein the amount of the tin constituent included in the first type of titanium oxide fine particle, expressed as a molar ratio with titanium (Ti/Sn), is from 1 to 1,000.

4. The visible light-responsive photocatalytic titanium oxide fine particle mixture of claim 1, wherein the transition metal constituent contained in solid solution in the first type of titanium oxide fine particle is at least one member selected from the group consisting of vanadium, chromium, manganese, niobium, molybdenum, rhodium, antimony, tungsten and cerium.

5. The visible light-responsive photocatalytic titanium oxide fine particle mixture of claim 4, wherein the transition metal constituent contained in solid solution in the first type of titanium oxide fine particle is at least one member selected from the group consisting of molybdenum, tungsten and vanadium.

6. The visible light-responsive photocatalytic titanium oxide fine particle mixture of claim 5, wherein the amount of the molybdenum or tungsten constituent included in the first type of titanium oxide fine particle, expressed as a molar ratio with titanium (Ti/Mo or Ti/W), is from 1 to 1,000.

7. The visible light-responsive photocatalytic titanium oxide fine particle mixture of claim 5, wherein the amount of the vanadium constituent included in the first type of titanium oxide fine particle, expressed as a molar ratio with titanium (Ti/V), is from 10 to 10,000.

8. The visible light-responsive photocatalytic titanium oxide fine particle mixture of claim 1, wherein the amount of the iron-group element constituent included in the second type of titanium oxide fine particle, expressed as a molar ratio with titanium (Ti/iron group element), is from 1 to 1,000.

9. The visible light-responsive photocatalytic titanium oxide fine particle mixture of claim 1, wherein the iron-group element constituent contained in solid solution in the second type of titanium oxide fine particle is an iron constituent.

10. The visible light-responsive photocatalytic titanium oxide fine particle mixture of claim 1, wherein the amount of the chromium-group element constituent included in the second type of titanium oxide fine particle, expressed as a molar ratio with titanium (Ti/chromium-group element), is from 1 to 1,000.

11. The visible light-responsive photocatalytic titanium oxide fine particle mixture of claim 1, wherein the chromium-group element constituent contained in solid solution in the second type of titanium oxide fine particle is at least one member selected from the group consisting of a molybdenum constituent and a tungsten constituent.

12. A photocatalytic thin film comprising the visible light-responsive photocatalytic titanium oxide fine particle mixture of claim 1.

13. The photocatalytic thin film of claim 12, further comprising a binder.

14. A member in which the photocatalytic thin film of claim 12 or 13 is formed on a substrate surface.

15. A visible light-responsive photocatalytic titanium oxide fine particle dispersion comprising:
   an aqueous dispersion medium;
   a first type of titanium oxide fine particle containing in solid solution a tin constituent and a transition metal constituent (exclusive of an iron-group element constituent) that increases visible light responsiveness; and
   a second type of titanium oxide fine particle containing in solid solution an iron-group element constituent and a chromium-group element constituent, wherein
   the first and second types of titanium oxide fine particles are dispersed in the aqueous dispersion medium, and the chromium-group element constituent contained in solid solution in the second type of titanium oxide fine particle is at least one member selected from the group consisting of a chromium constituent, a molybdenum constituent, and a tungsten constituent.

16. The visible light-responsive photocatalytic titanium oxide fine particle dispersion of claim 15, further comprising a binder.

17. The visible light-responsive photocatalytic titanium oxide fine particle dispersion of claim 16, wherein the binder is a silicon compound-based binder.

18. A method for preparing the visible light-responsive photocatalytic titanium oxide fine particle dispersion of claim 15, comprising the steps of:
(1) preparing a tin and transition metal constituent-containing peroxotitanic acid solution from a starting titanium compound, a tin compound, a transition metal compound (exclusive of an iron-group element compound), a basic substance, a hydrogen peroxide and an aqueous dispersion medium;
(2) preparing a tin and transition metal constituent-containing titanium oxide fine particle dispersion by heating at between 80° C. and 250° C. and under pressure control the tin and transition metal constituent-containing peroxotitanic acid solution obtained in step (1);
(3) preparing an iron-group element and chromium-group element constituent-containing peroxotitanic acid solution from a starting titanium compound, an iron-group element compound, a chromium-group element compound, a basic substance, hydrogen peroxide and an aqueous dispersion medium;
(4) preparing an iron-group element and chromium-group element constituent-containing titanium oxide fine particle dispersion by heating at between 80° C. and 250° C. and under pressure control the iron-group element and chromium-group element constituent-containing peroxotitanic acid solution obtained in step (3); and
(5) mixing together the tin and transition metal constituent-containing titanium oxide fine particle dispersion prepared in the step (2) and the iron-group element and chromium-group element constituent-containing titanium oxide fine particle dispersion prepared in the step (4).

* * * * *